(12) United States Patent
Ota et al.

(10) Patent No.: US 11,565,498 B2
(45) Date of Patent: Jan. 31, 2023

(54) ACCOMMODATING BODY, BUFFERING MATERIAL, METHOD FOR MANUFACTURING BUFFERING MATERIAL, AND BUFFERING MATERIAL MANUFACTURING APPARATUS

(71) Applicant: SEIKO EPSON CORPORATION, Tokyo (JP)

(72) Inventors: Tsukasa Ota, Yamanashi (JP); Hidehiro Takano, Nagano (JP); Satomi Yoshioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/151,712

(22) Filed: Jan. 19, 2021

(65) Prior Publication Data
US 2021/0221096 A1    Jul. 22, 2021

(30) Foreign Application Priority Data

Jan. 21, 2020 (JP) .............................. JP2020-007405
Jan. 21, 2020 (JP) .............................. JP2020-007409

(51) Int. Cl.
| | | |
|---|---|---|
| *B32B 5/26* | (2006.01) | |
| *B32B 5/02* | (2006.01) | |
| *B65D 81/02* | (2006.01) | |
| *B65D 81/107* | (2006.01) | |

(52) U.S. Cl.
CPC ................ *B32B 5/26* (2013.01); *B32B 5/022* (2013.01); *B65D 65/44* (2013.01); *B65D 81/1075* (2013.01); *B32B 2250/20* (2013.01)

(58) Field of Classification Search
CPC .... B65D 65/44; B65D 81/056; B65D 81/107; B65D 81/1075; B65D 81/113; B32B 5/26; B32B 5/022; B32B 2250/20
USPC ........ 206/589, 523, 591–592, 521, 594, 587
See application file for complete search history.

(56) References Cited

U.S. PATENT DOCUMENTS 3,648,920 A * 3/1972 Stump .................. B65D 5/5033
229/199
3,777,882 A * 12/1973 McIntyre ........... B65D 81/1075
220/23.88
5,040,678 A * 8/1991 Lenmark, Sr. ....... B65D 81/107
206/443

(Continued)

FOREIGN PATENT DOCUMENTS

| CN | 109969612 A | 7/2019 |
|---|---|---|
| CN | 110093805 A | 8/2019 |

(Continued)

*Primary Examiner* — Chun Hoi Cheung
(74) *Attorney, Agent, or Firm* — Global IP Counselors, LLP

(57) ABSTRACT

An accommodating body includes: a first accommodating body that has a first bottom portion; and a first buffering material that has a first pressure receiving surface coming into contact with an accommodated article accommodated in the first accommodating body and that has at least one first sheet-shaped web that contains fibers and a bonding material that bonds the fibers, and in which in the first sheet-shaped web, the fibers are oriented in a plane direction of the first sheet-shaped web, and the first buffering material is used in an orientation with which an end surface of the first sheet-shaped web serves as the first pressure receiving surface.

8 Claims, 19 Drawing Sheets

(56) References Cited

U.S. PATENT DOCUMENTS

| | | | | |
|---|---|---|---|---|
| 6,341,708 B1* | 1/2002 | Palley | ............... | B65D 90/325 |
| | | | | 229/122.34 |
| 6,347,700 B1* | 2/2002 | Redfield | ............... | F42B 39/00 |
| | | | | 217/53 |
| 7,395,922 B1* | 7/2008 | Sinha | ............... | F42B 39/24 |
| | | | | 206/593 |
| 7,584,851 B2* | 9/2009 | Hong | ............... | B65D 5/509 |
| | | | | 206/723 |
| 7,810,639 B2* | 10/2010 | Djulaini | ............... | B65D 81/113 |
| | | | | 206/307 |
| 8,807,341 B2* | 8/2014 | Chan | ............... | B65D 85/30 |
| | | | | 206/593 |
| 9,072,653 B2* | 7/2015 | Nemard | ............... | B65D 23/102 |
| 2002/0033352 A1* | 3/2002 | Levin | ............... | B65B 55/20 |
| | | | | 53/472 |
| 2004/0060843 A1* | 4/2004 | Sabol | ............... | B65D 81/107 |
| | | | | 206/499 |
| 2011/0056868 A1* | 3/2011 | Ting | ............... | B65D 85/48 |
| | | | | 206/587 |
| 2011/0089072 A1* | 4/2011 | Gillam | ............... | B65D 81/113 |
| | | | | 156/160 |
| 2011/0253589 A1* | 10/2011 | Webb | ............... | B32B 29/08 |
| | | | | 428/116 |
| 2019/0232606 A1 | 8/2019 | Ota | | |

FOREIGN PATENT DOCUMENTS

| | | |
|---|---|---|
| JP | H09-019907 A | 1/1997 |
| JP | 2010-036945 A | 2/2010 |
| WO | 2007/018051 A1 | 2/2007 |

* cited by examiner

ACCOMMODATING BODY, BUFFERING MATERIAL, METHOD FOR MANUFACTURING BUFFERING MATERIAL, AND BUFFERING MATERIAL MANUFACTURING APPARATUS

The present application is based on, and claims priority from JP Application Serial Number 2020-007409, filed Jan. 21, 2020, and JP Application Serial Number 2020-007405, filed Jan. 21, 2020, the disclosures of which are hereby incorporated by reference herein in their entirety.

BACKGROUND

1. Technical Field

The present disclosure relates to an accommodating body, a buffering material, a method for manufacturing a buffering material, and a buffering material manufacturing apparatus.

2. Related Art

A method for manufacturing a plate-shaped material made of fiber by overlapping non-woven clothes as described in International Publication No. 2007/018051, for example, is known. Packaging materials using fiber have an advantage that they have a less environmental burden than that of packaging materials made of styrofoam or the like. Also, JP-A-9-019907 discloses a waste paper board shaped by heating and pressurizing a mixture of a spongy waste paper pulp granular material, which is obtained by adding water to waste paper pulp defibrated in a dry method and a synthetic resin in a fiber form or powder form with thermoplasticity.

However, it is difficult to allow packaging materials using fibers or waste paper boards to have a buffering effect against impact.

SUMMARY

An accommodating body according to the present disclosure includes a first accommodating body that has a first bottom portion, and a first buffering material that has a first pressure receiving surface coming into contact with an accommodated article accommodated in the first accommodating body and that has at least one first sheet-shaped web that contains fibers and a bonding material that bonds the fibers, in the first sheet-shaped web, the fibers are oriented in a plane direction of the first sheet-shaped web, and the first buffering material is used in an orientation with which an end surface of the first sheet-shaped web serves as the first pressure receiving surface.

A buffering material according to the present disclosure includes a molded article obtained by molding a sheet-shaped web that contains fibers and a bonding material that bonds the fibers and that has a first surface and a second surface that are opposite to each other, the molded article is molded into a wave shape that has first curved portions projecting on a side of the first surface, second curved portions projecting on a side of the second surface, and intermediate portions located between the first curved portions and the second curved portions, and in the intermediate portions, the fibers are oriented in a direction that intersects a plane direction of the molded article.

A method for manufacturing a buffering material according to the present disclosure includes a web forming step of forming a sheet-shaped web, which contains fibers and a bonding material that bonds the fibers and has a first surface and a second surface opposite to each other, and in which the fibers are oriented in a plane direction of the first surface and the second surface, a first molding step of molding the sheet-shaped web into an intermediate article with a wave shape that has first curved portions projecting on a side of the first surface, second curved portions projecting on a side of the second surface, and intermediate portions located between the first curved portions and the second curved portions, and a second molding step of molding the intermediate article into a molded article by reducing pitches of the wave shape of the intermediate article.

A buffering material manufacturing apparatus according to the present disclosure includes a web forming portion that forms a sheet-shaped web, which contains fibers and a bonding material that bonds the fibers and has a first surface and a second surface opposite to each other, and in which the fibers are oriented in a plane direction of the first surface and the second surface, a first molding portion that molds the sheet-shaped web into an intermediate article with a wave shape that has first curved portions projecting on a side of the first surface, second curved portions projecting on a side of the second surface, and intermediate portions located between the first curved portions and the second curved portions, and a second molding portion that molds the intermediate article into a molded article by reducing pitches of the wave shape of the intermediate article.

DESCRIPTION OF EXEMPLARY EMBODIMENTS

Hereinafter, an accommodating body, a buffering material, a method for manufacturing a buffering material, and a buffering material manufacturing apparatus according to the present disclosure will be described in detail based on suitable embodiments illustrated in the accompanying drawings.

First Embodiment

Figure 1:
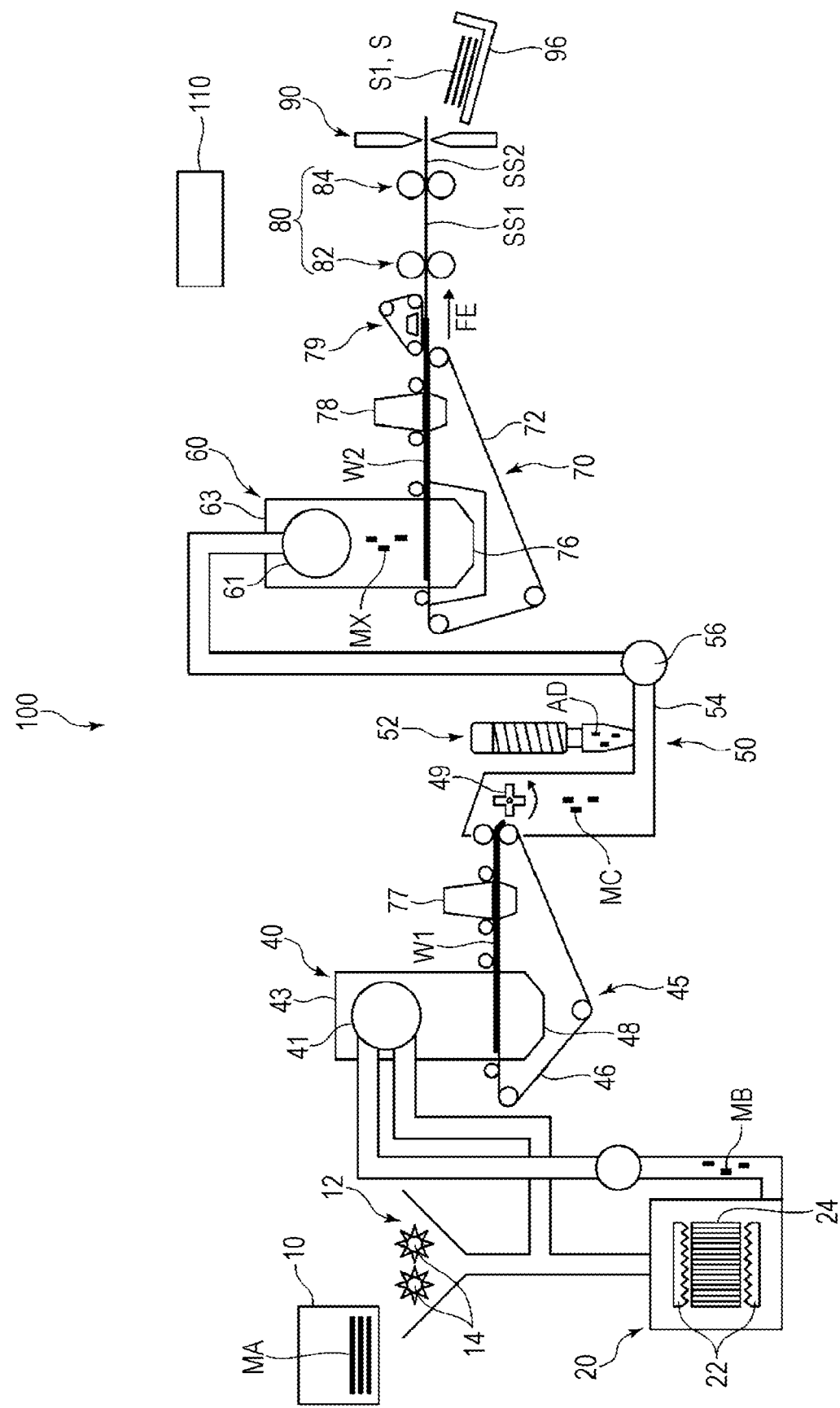
FIG. 1 is a schematic configuration diagram illustrating an example of a sheet manufacturing apparatus that manufactures a sheet-shaped web configuring a first buffering material included in an accommodating body according to the present disclosure.
Figure 2:
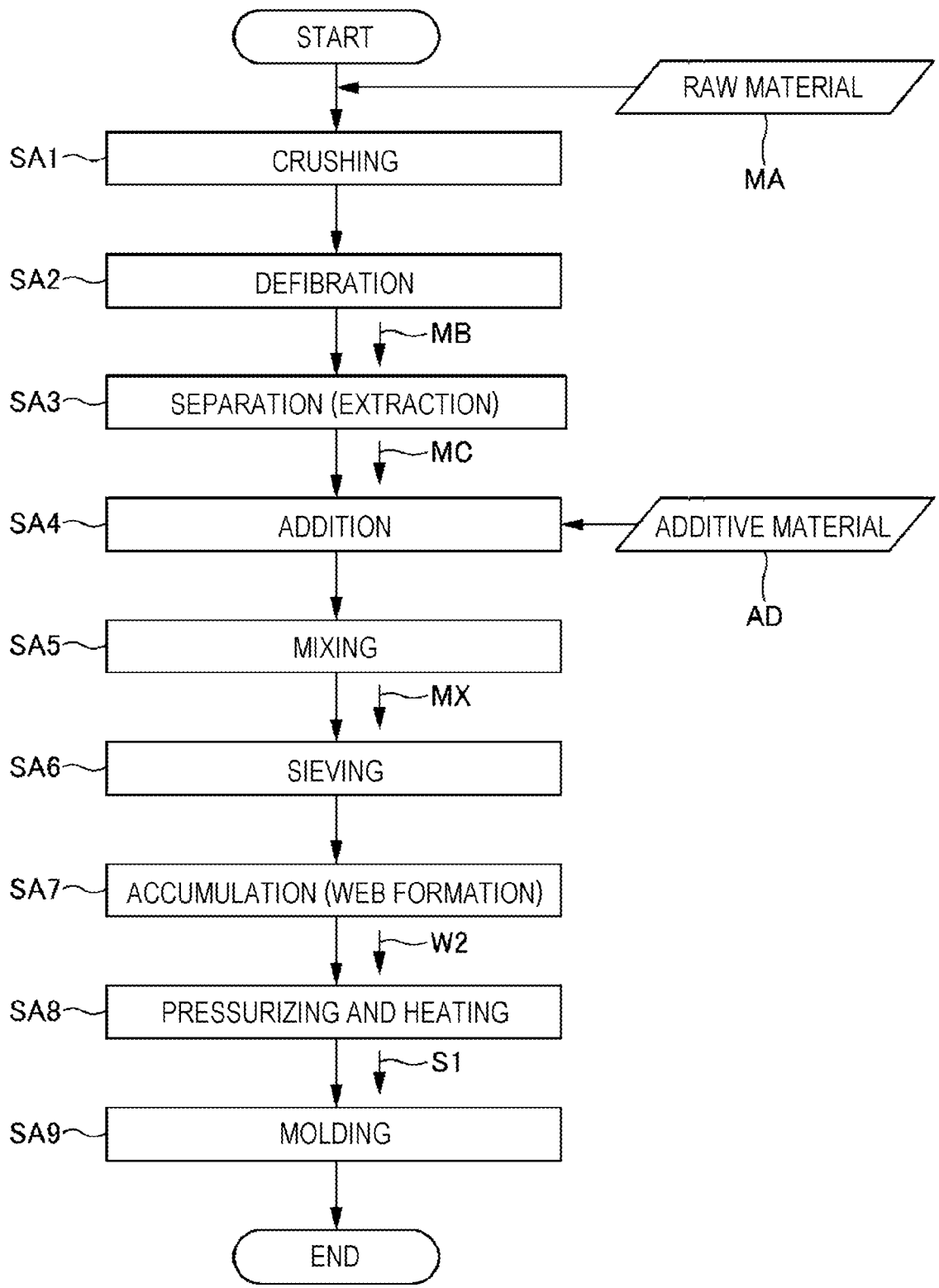
FIG. 2 is a flowchart illustrating a step for manufacturing a sheet-shaped web.
Figure 3:
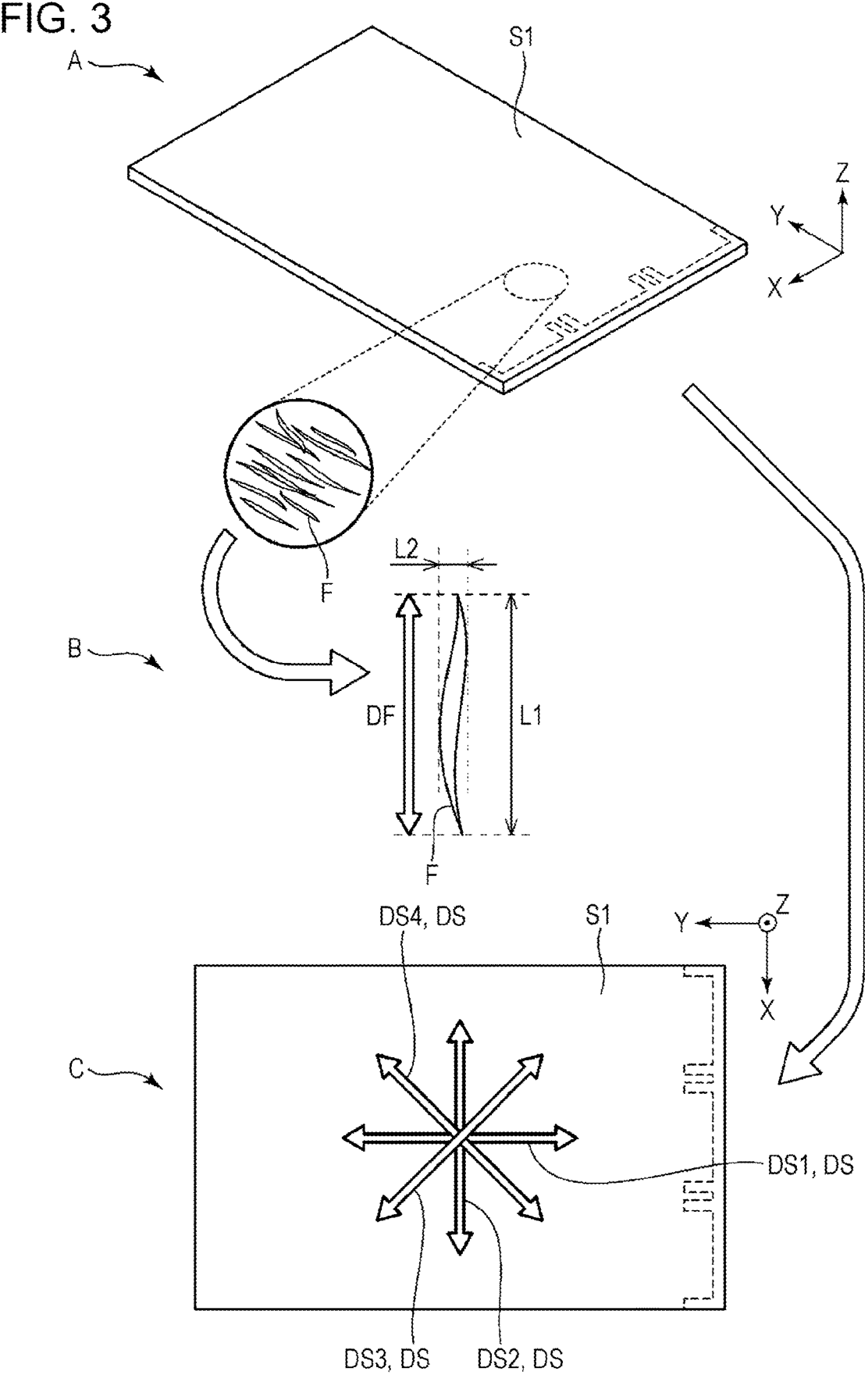
FIG. 3 is a diagram for explaining a fiber orientation direction in the sheet-shaped web.
Figure 4:
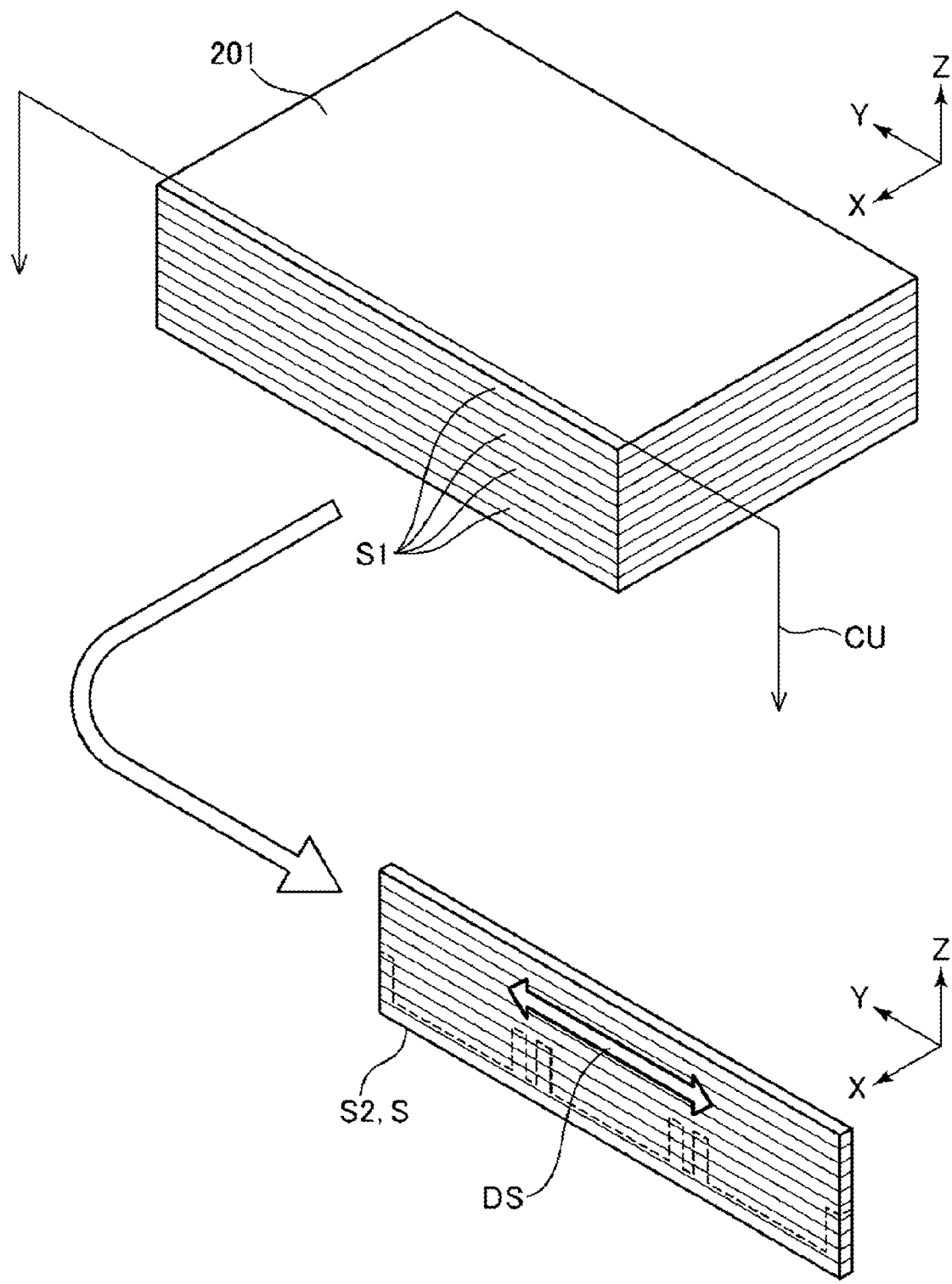
FIG. 4 is a diagram for explaining a fiber orientation direction in the sheet-shaped web.
Figure 5:
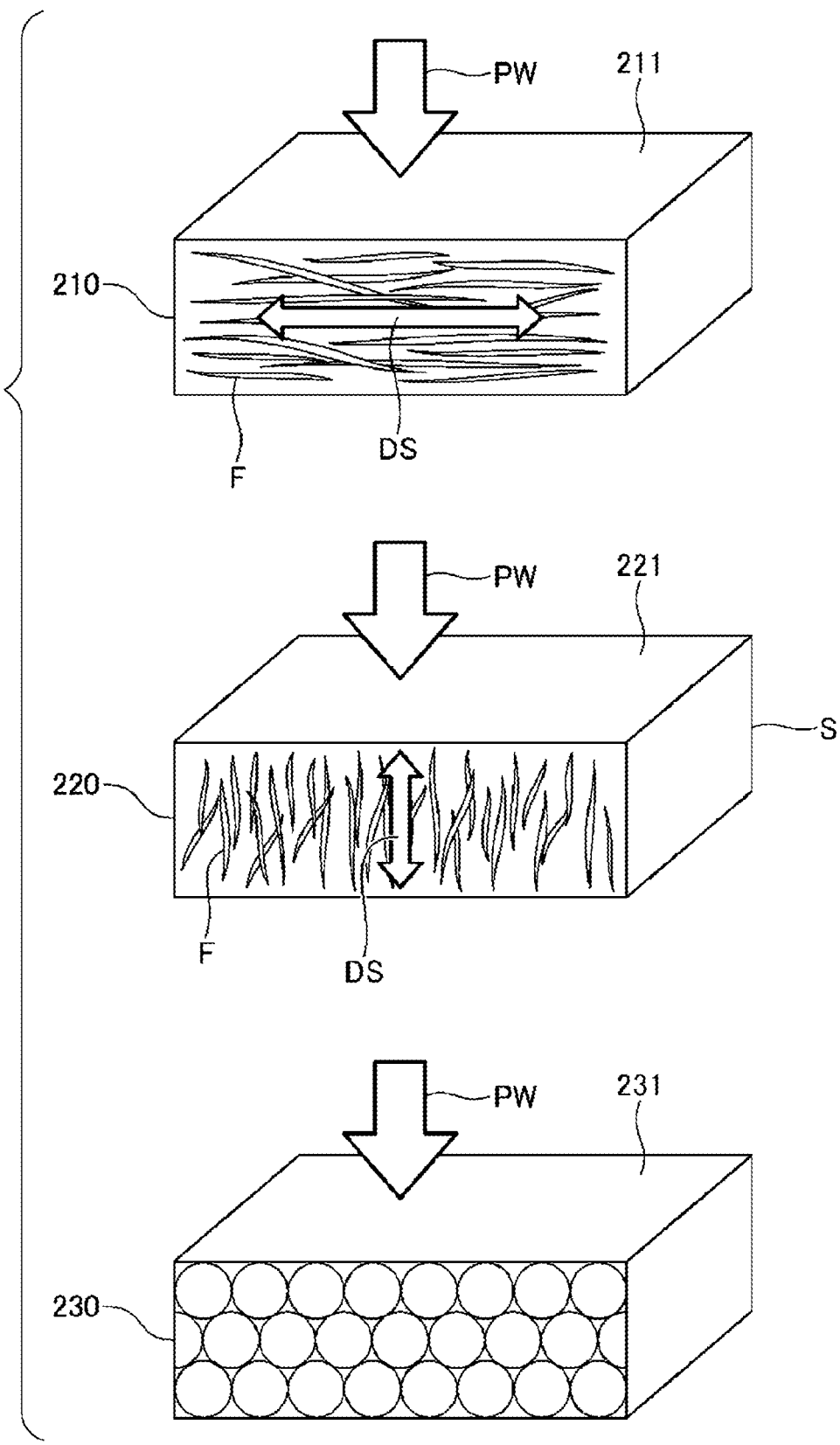
FIG. 5 is a diagram illustrating a configuration of a test piece for testing a buffering function.
Figure 6:
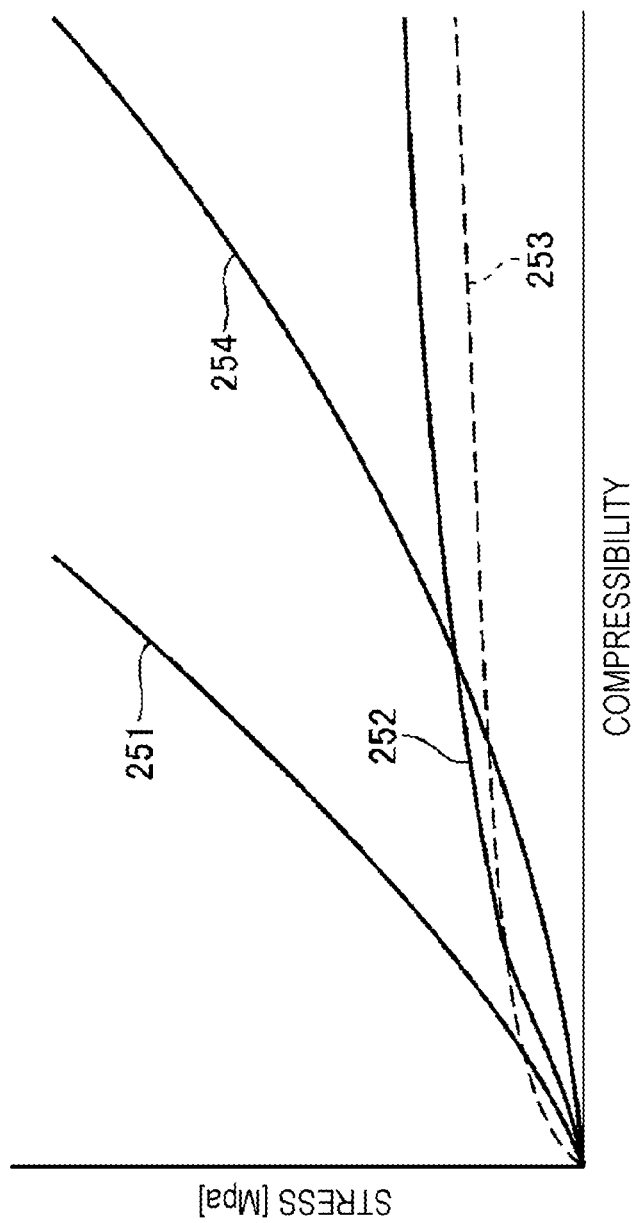
FIG. 6 is a graph illustrating test results of the buffering function.
Figure 7:
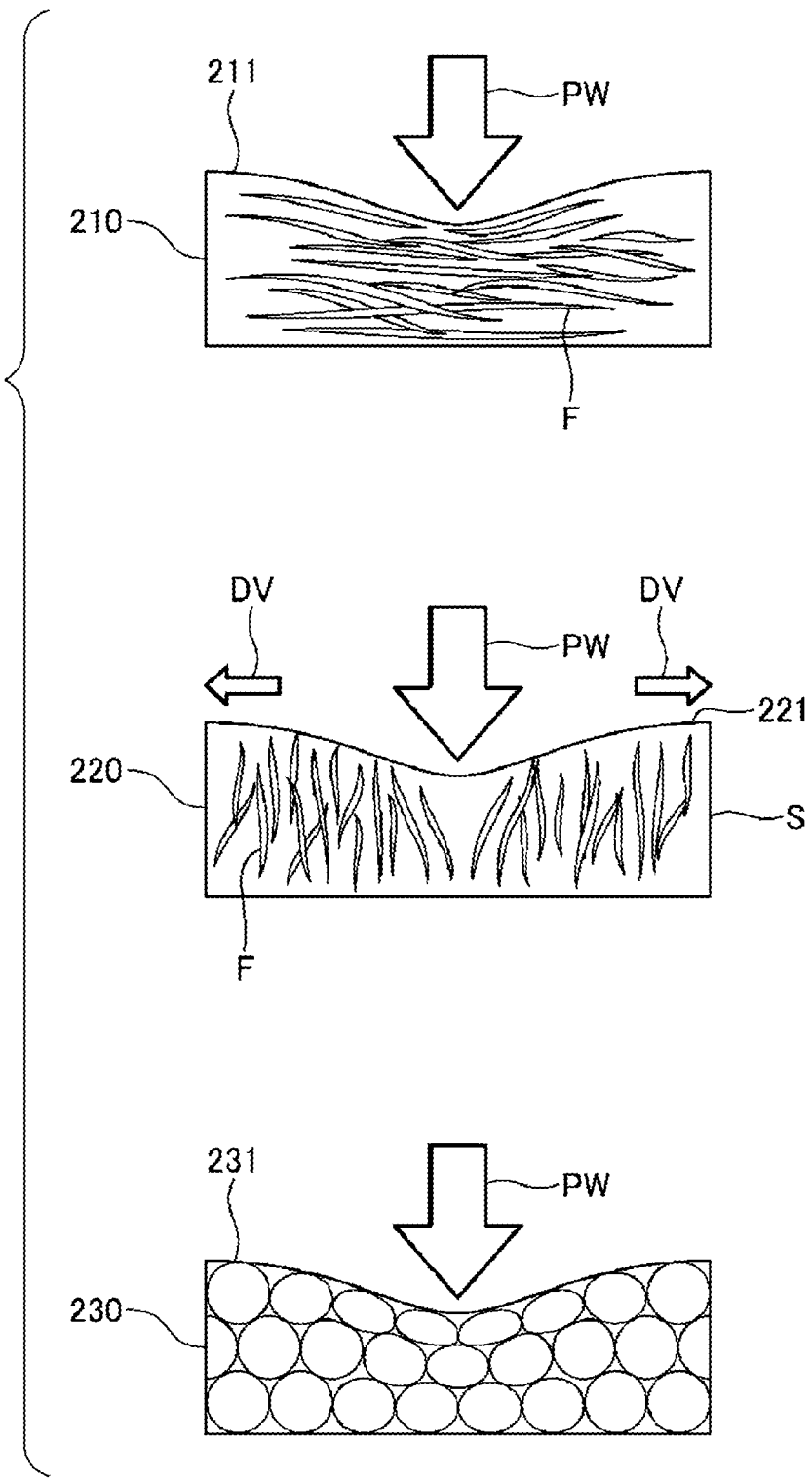
FIG. 7 is a schematic view illustrating an expression state of the buffering function.

FIG. 1 is a schematic configuration diagram illustrating an example of a sheet manufacturing apparatus for manufacturing a sheet-shaped web that configures a first buffering material included in an accommodating body according to the present disclosure. FIG. 2 is a flowchart illustrating a step for manufacturing a sheet-shaped web. FIGS. 3 and 4 are diagrams for explaining a fiber orientation direction in the sheet-shaped web. FIG. 5 is a diagram illustrating a configuration of a test piece for testing a buffering function. FIG. 6 is a graph illustrating test results of the buffering function. FIG. 7 is a schematic view illustrating an expression state of the buffering function.

In the following description, the upper side in FIGS. 1, 3, 4, 5, and 7 will also be referred to as "above" or an "upper side" while the lower side therein will also be referred to as "below" or a "lower side" for convenience of explanation.

Also, FIG. 4 illustrates an X axis, a Y axis, and a Z axis as three axes that are orthogonal to each other for convenience of explanation. In the following description, the direction that is parallel to the X axis will also be referred to as an "X-axis direction", the direction that is parallel to the Y axis will also be referred to as a "Y-axis direction", and a direction that is parallel to the Z axis will also be referred to as a "Z-axis direction". In the following description, the leading end side of each illustrated arrow will be referred to as "+ (positive)" while the base end side thereof will be referred to as "− (negative)".

As illustrated in FIG. 1, a sheet manufacturing apparatus 100 includes a supply portion 10, a crushing portion 12, a defibrating portion 20, a sorting portion 40, a first web forming portion 45, a rotating body 49, a mixing portion 50, a dispersion portion 60, a second web forming portion 70, a web transport portion 79, a processing portion 80, and a cutting portion 90.

The sheet manufacturing apparatus 100 fiberizes a raw material MA containing fiber such as a wood pulp material, kraft pulp, waste paper, and synthetic pulp described later to manufacture a sheet-shaped web S1. The raw material MA preferably contains a cellulose fiber, and a wood pulp material, kraft pulp, waste paper, synthetic pulp, and the like can be used, for example. Examples of the wood pulp materials include mechanical pulp made by a mechanical process such as ground pulp, chemical pulp made by a chemical process, semi-chemical pulp and chemiground pulp that are manufactured by using both of these processes.

The raw material MA may be any of bleached pulp or non-bleached pulp, and examples thereof include virgin pulp such as bleached softwood kraft pulp (N-BKP) and bleached hardwood kraft pulp (L-BKP) and bleached chemithermomechanical pulp (BCTMP). Also, a nano-cellulose fiber (NCF) may also be used. The waste paper is used paper such as plain paper copy (PPC) paper after printing, magazines, and newspapers. Examples of the synthetic pulp include SWP manufactured by Mitsui Chemicals, Inc. SWP is a registered trademark.

Also, the raw material MA may contain carbon fiber, metal fiber, or thixotropic fiber in addition to or instead of the aforementioned wood pulp material, waste paper, synthetic pulp and the like. Therefore, the raw material MA may be a mixture obtained by mixing a plurality of materials selected from the aforementioned wood pulp material, waste paper, synthetic pulp, carbon fiber, metal fiber, and thixotropic fiber. The raw material MA, and defibrated articles MB and fiber material MC, which will be described later, may be materials containing fibers.

The supply portion 10 supplies the raw material MA to the crushing portion 12. The crushing portion 12 is a shredder that cuts the raw material MA by using a crushing blade 14. The raw material MA cut by the crushing portion 12 is transported to the defibrating portion 20 through a pipe.

The defibrating portion 20 defibrates the crushed pieces cut by the crushing portion 12 into defibrated articles MB by a dry method. The defibration is a process of disentangling the raw material MA in a state in which a plurality of the fibers are bound into one or a few fibers. The dry method refers to performing a process such as defibration in gas, such as in the air, instead of in a liquid. The defibrated articles MB include the fibers contained in the raw material MA. The defibrated articles MB may include substances other than the fibers contained in the raw material MA. When waste paper is used as the raw material MA, for example, the defibrated articles MB contain constituents such as resin particles, a colorant such as ink or a toner, an anti-bleeding agent, and a paper strengthening agents.

The defibrating portion 20 is, for example, a mill including a tubular stator 22 and a rotor 24 that rotates inside the stator 22, and defibrates the crushed pieces with the crushed pieces sandwiched between the stator 22 and the rotor 24. The defibrated articles MB are sent to the sorting portion 40 through a pipe.

The fibers contained in the raw material MA or the fibers contained in the defibrated articles MB preferably have a fiber length of equal to or greater than 0.1 mm and equal to or less than 100 mm, and more preferably have a fiber length of equal to or greater than 0.5 mm and equal to or less than 50 mm. The fiber diameter is preferably equal to or greater than 0.1 μm and equal to or less than 1,000 μm and is more preferably equal to or greater than 1 μm and equal to or less than 500 μm or less. The fiber may include a plurality of types of fiber, and may include fiber that has at least either different fiber lengths or different fiber diameters. The fiber lengths and the fiber diameters can be obtained by performing measurement with a fiber tester (manufactured by Lorentzen & Wettre), for example, and calculating length weighted average values therefrom.

The sorting portion 40 has a drum portion 41 and a housing portion 43 that accommodates the drum portion 41. The drum portion 41 is a sieve having openings such as a net, a filter, or a screen and is rotated by power of a motor, which is not illustrated. The defibrated articles MB are loosened inside the rotating drum portion 41 and is lowered through the openings of the drum portion 41. Substances that do not pass through the openings of the drum portion 41 among the constituents of the defibrated articles MB are transported to the defibrating portion 20 through a pipe.

The first web forming portion 45 includes an endless mesh belt 46 having a large number of openings. The first web forming portion 45 manufactures a first web W1 by accumulating fiber and the like lowered from the drum portion 41 on the mesh belt 46. Substances that are smaller than the openings of the mesh belt 46 among the constituents lowered from the drum portion 41 are suctioned and removed by a suctioning portion 48 through the mesh belt 46. In this manner, fiber that is short and is not suitable for manufacturing of the sheet-shaped web S1, resin particles, ink, a toner, an anti-bleeding agent, and the like among the constituents of the defibrated articles MB are removed.

A humidifier 77 is disposed on a movement path of the mesh belt 46, and the first web W1 accumulated on the mesh belt 46 is humidified by mist of water or high-humidity air. The first web W1 is transported by the mesh belt 46 and comes into contact with the rotating body 49. The rotating body 49 decouples the first web W1 by a plurality of blades to form the fiber material MC. The fiber material MC is transported to the mixing portion 50 through a pipe 54.

The mixing portion 50 includes an additive supply portion 52 that adds an additive material AD to the fiber material MC and a mixing blower 56 that mixes the fiber material MC and the additive material AD. The additive material AD will be described later. The mixing blower 56 generates an air flow in the pipe 54 in which the fiber material MC and the additive material AD are transported, mixes the fiber material MC and the additive material AD, and transports a mixture MX to the dispersion portion 60.

The dispersion portion 60 includes a drum portion 61 and a housing portion 63 that accommodates the drum portion 61. The drum portion 61 is a cylindrical sieve configured similarly to the drum portion 41 and is driven and rotated by a motor, which is not illustrated. The mixture MX is disentangled through the rotation of the drum portion 61 and is then lowered inside the housing portion 63.

The second web forming portion 70 includes an endless mesh belt 72 having a large number of openings. The second web forming portion 70 manufactures a second web W2 by accumulating the mixture MX lowered from the drum portion 61 on the mesh belt 72. Substances that are smaller than the openings of the mesh belt 72 among the constituents of the mixture MX are suctioned by a suctioning portion 76 through the mesh belt 72.

A humidifier 78 is disposed on a movement path of the mesh belt 72, and the second web W2 accumulated on the mesh belt 72 is humidified by mist of water or high-humidity air.

The second web W2 is peeled off from the mesh belt 72 by the web transport portion 79 and is transported to the processing portion 80. The processing portion 80 includes a pressurizing portion 82 and a heating portion 84. The pressurizing portion 82 nips the second web W2 by a pair of pressurizing rollers and pressurizes the second web W2 with a predetermined nip pressure to form a pressurized sheet-shaped web SS1. The heating portion 84 applies heat to the pressurized sheet-shaped web SS1 with the pressurized sheet-shaped web SS1 nipped by a pair of heating rollers. In this manner, the fibers contained in the pressurized sheet-shaped web SS1 are bound to each other by the resin contained in the additive material AD, and a heated sheet-shaped web SS2 is thus formed. The heated sheet-shaped web SS2 is transported to the cutting portion 90.

The cutting portion 90 cuts the heated sheet-shaped web SS2 in at least one of a direction intersecting a transport direction FE and a direction along the transport direction FE to manufacture the sheet-shaped web S1 with a predetermined size. The sheet-shaped web S1 is stored in a discharge portion 96.

The sheet manufacturing apparatus 100 includes a control device 110. The control device 110 controls each part of the sheet manufacturing apparatus 100 including the defibrating portion 20, the additive supply portion 52, the mixing blower 56, the dispersion portion 60, the second web forming portion 70, the processing portion 80, and the cutting portion 90 to execute the method for manufacturing the sheet-shaped web S1. Also, the control device 110 may control operations of the supply portion 10, the sorting portion 40, the first web forming portion 45, and the rotating body 49.

The additive material AD is a bonding material that crosslinks a plurality of fibers to bond the fibers to each other. In this manner, it is possible to precisely mold the fibers into a sheet shape. The additive material AD includes a resin that functions as a bonding material that binds the fibers together and specifically includes at least one of a thermoplastic resin and a thermosetting resin. The thermoplastic resin may have a core-sheath structure. Also, the additive material AD may include a colorant, an aggregation inhibitor, a flame retardant, and the like in addition to the aforementioned resins.

As the thermoplastic resin, a resin with a melting temperature of equal to or greater than 60° C. and equal to or less than 200° C. and with a deformation temperature of equal to or greater than 50° C. and equal to or less than 180° C., for example, can be used. Here, the deformation temperature can also be referred to as a glass transition temperature. As the thermoplastic resin, a petroleum-derived resin, biomass plastic, biodegradable plastic, or natural resin can be used. Here, examples of the petroleum-derived resin include a polyolefin-based resin, a polyester-based resin, a polyamide-based resin, polyacetal, polycarbonate, modified polyphenylene ether, cyclic polyolefin, an ABS resin, polystyrene, polyvinyl chloride, polyvinyl acetate, polyurethane, a Teflon resin, an acrylic resin, polyphenylene sulfide, polytetrafluoroethylene, polysulfone, polyether sulfones, amorphous polyarylate, a liquid crystal polymer, polyether ether ketone, thermoplastic polyimide, and polyamideimide. Examples of biomass plastic and biodegradable plastic include a polylactic acid, polycaprolactone, modified starch, polyhydroxybutyrate, polybutylene succinate, polybutylene succinate, and polybutylene succinate adipate. Examples of the natural resin include rosin. Teflon is a registered trademark. Examples of thermosetting resin include a phenolic resin, an epoxy resin, a vinyl ester resin, unsaturated polyester, and the like and a natural thermosetting resin such as shellac. The additive material AD contains one or a plurality of the aforementioned resins. For example, a plurality of resins with different glass transition temperatures Tg and melting points may be contained.

The resin contained in the additive material AD is preferably in the form of particles or fiber. When a particulate resin is used, particles with a weight average particle diameter of equal to or greater than 0.1 μm and equal to or less than 120 µm are preferably used, and particles with a weight average particle diameter of equal to or greater than 1 µm and equal to or less than 50 µm or are more preferably used.

The additive material AD may contain a resin material or a polymer material that forms a porous structure through heating, in addition to the aforementioned resins. These materials are, for example, thermally expandable materials that expand through heating. So-called foaming materials can be used as the thermally expandable materials. The thermally expandable materials are preferably in the form of particles, and the thermally expandable materials molded in the form of particles can be referred to as foaming particles. The particle diameter of the foaming particles contained in the additive material AD is preferably equal to or greater than 0.5 µm and equal to or less than 1,000 µm, is more preferably equal to or greater than 1 µm and equal to or less than 1,000 µm, is further preferably equal to or greater than 5 µm and equal to or less than 800 µm, and is particularly preferably equal to or greater than 5 µm and equal to or less than 300 µm in terms of the weight average particle diameter before foaming.

As the foaming particles, a capsule-shaped thermally expandable capsule that expands due to heat or a foaming material mixed particles into which a thermally expandable material is mixed can be used. Examples of thermally expandable capsules include Advancell manufactured by Sekisui Chemical Co., Ltd., Kureha microsphere manufactured by Kureha Co., Ltd., Expancel manufactured by Akzo Nobel Co., Ltd., and Matsumoto Microsphere manufactured by Matsumoto Yushi-Seiyaku Co., Ltd. Advancell, Kureha microsphere, Expancel, and Matsumoto Microsphere are registered trademarks. The foaming material mixed particles are a particulate preparation manufactured by mixing a thermally expandable material with the aforementioned thermoplastic resin. Here, as the foaming material, azodicarbonamide, N, N'-dinitrosopentamethylenetetramine, 4,4'-oxybis (benzenesulfonylhydrazide, N, N'-dinitrosopentamethylenetetramine, azodicarbonamide, or sodium hydrogen carbonate, for example, can be used.

When the surfaces of the foaming particles are covered with the resin, the coverage of the foaming particles with the resin is preferably equal to or greater than 10% and equal to or less than 100%.

The additive material AD may contain an inorganic filler, rigid fiber, or thixotropic fiber, in addition to the aforementioned resin, as a reinforcing material that makes the cross-linked structure in which the fibers are bound to each other more rigid. As the inorganic filler, calcium carbonate or mica, for example, can be used. As the rigid fiber, carbon fiber, glass fiber, or metal fiber, for example, can be used. Also, high-rigidity fiber such as Kevlar or other aramid fiber can be used. Kevlar is a registered trademark. Examples of thixotropic fiber include cellulose nanofiber.

Also, the additive material AD may be formed as a composite resin material powder by kneading and pulverizing the aforementioned constituents such as the resin, the foaming particles, and the reinforcing material.

Next, a method for manufacturing the sheet-shaped web S1 will be described.

The manufacturing method illustrated in FIG. 2 includes a step of manufacturing the sheet-shaped web S1 using the sheet manufacturing apparatus 100.

Step SA1 is a crushing step of crushing the raw material MA and corresponds to a process performed by the crushing portion 12 of the sheet manufacturing apparatus 100, for example. The crushing step is a step of cutting the raw material MA into a size that is equal to or less than a predetermined size. The predetermined size is, for example, 1 cm to 5 cm square. When the raw material MA is supplied in a cut state, Step SA1 can be omitted.

Step SA2 is a defibration step and corresponds to a process performed by the defibrating portion 20 of the sheet manufacturing apparatus 100, for example. Step SA3 is a step of taking out the material composed mainly of fiber from the defibrated articles MB and is referred to as a separation step. The separation step is a step of separating particles such as a resin and an additive from the defibrated articles MB including fiber and resin particles and taking out a material containing fibers as a main constituent. The separation step corresponds to a process performed by the sorting portion 40 and the rotating body 49 of the sheet manufacturing apparatus 100, for example.

When the raw material MA supplied in step SA1 does not contain particles or the like that affect the manufacturing of the sheet-shaped web S1, or when it is not necessary to remove the particles or the like from the constituents contained in the raw material MA, the separation step in Step SA3 can be omitted. In this case, the defibrated articles MB are used as they are as the fiber material MC.

Step SA4 is an addition step and is a step of adding the additive material AD to the fiber material MC separated in Step SA3. The addition step corresponds to, for example, the process performed by the additive supply portion 52 of the sheet manufacturing apparatus 100.

Step SA5 is a mixing step and is a step of manufacturing the mixture MX by mixing the fiber material MC with the additive material AD. The mixing step corresponds to, for example, a process performed by the mixing portion 50 of the sheet manufacturing apparatus 100.

Step SA6 is a sieving step and is a step of sieving the mixture MX to disperse it in the atmosphere and lowering it. The sieving step corresponds to, for example, the process performed by the dispersion portion 60 of the sheet manufacturing apparatus 100.

Step SA7 is an accumulation step and is a step of accumulating the mixture MX lowered in the sieving step in Step SA6 to form a web. The accumulation step corresponds to, for example, a process of forming the second web W2 by the second web forming portion 70 of the sheet manufacturing apparatus 100.

Step SA8 is a pressurizing and heating step, in which the web is pressurized and heated. The pressurizing and heating step corresponds to, for example, a process of pressurizing and heating the second web W2 by the processing portion 80 of the sheet manufacturing apparatus 100 and forming the sheet-shaped web S1 through the pressurized sheet-shaped web SS1 and the heated sheet-shaped web SS2. Although the order of pressurization and heating in the pressurizing and heating step is not limited, the pressurization is preferably performed first.

The fiber orientation direction DS of the sheet-shaped web S1 becomes the direction along the plane direction of the sheet-shaped web S1 as will be describe later through such Step SA7 and Step SA8.

Step SA9 is a molding step of molding a buffering material, that is, a first buffering material 32 and second buffering materials 34, using the sheet-shaped web S1. In the molding step, a fiber structure with a box shape or the like is produced through processes such as coupling, joining, and adhering performed on the sheet-shaped webs S1. In the molding step, it is possible to use construction methods such as adhesion with an adhesive material, thermal fusion using melting of a thermoplastic resin, skewering with a core material, and binding with a fastening component to join a plurality of sheet-shaped webs S1, and simple joining using roughness of the fiber surfaces of the sheet-shaped webs S1 may be employed.

The manufacturing step illustrated in FIG. 2 is not limited to the case in which the sheet manufacturing apparatus 100 is used, and it is a matter of course that the sheet-shaped web S1 manufactured by another apparatus can be used. Also, the manufacturing step illustrated in FIG. 2 as a method for manufacturing the buffering material is just an example, and a sheet-shaped web S1 manufactured by another method may be used.

FIG. 3 is an explanatory diagram of the fiber orientation direction in the sheet-shaped web S1. As indicated by the reference sign A in FIG. 3, the sheet-shaped web S1 is a sheet with a thin planar shape or flexibility. The sheet-shaped web S1 is obtained by sieving and accumulating a mixture of fiber contained in defibrated articles obtained by defibrating the raw material MA and a particulate or fiber form resin. Therefore, on the assumption of an X-Y-Z orthogonal coordinate system with the plane of the sheet-shaped web S1 included as an X-Y plane, fiber F contained in the sheet-shaped web S1 is directed in random directions in the X-Y plane while being directed in the direction along the plane of the sheet-shaped web S1 in the Z direction. The pieces of fiber F contained in the sheet-shaped web S1 are laminated and overlap each other, or alternatively, the fiber F comes into point contact with other fiber F to have a structure with a certain orientation. Therefore, since the fiber F is in the plane of the X-Y plane of the sheet-shaped web S1, it is possible to state that the X-Y plane is the orientation direction of the fiber F.

Further, directions of the fiber F may be unevenly distributed in the X-Y plane of the sheet-shaped web S1. When the sheet-shaped web S1 is manufactured by the sheet manufacturing apparatus 100, the step of accumulating the mixture MX on the mesh belt 72 with rotation of the cylindrical drum portion 61 is performed. In this accumulation step (Step SA7), the fiber contained in the mixture MX is likely to be oriented in the direction along the rotation direction of the drum portion 61. Therefore, the second web W2 tends to contain a lot of fibers F with an orientation along the rotation direction of the drum portion 61. Therefore, the sheet-shaped web S1 also contains a lot of fibers F oriented in the rotation direction of the drum portion 61.

Here, the direction of the fiber F is indicated by the reference sign B in FIG. 3. The fiber F typically has a thin and long shape. The size of the fiber F in the longitudinal direction can be referred to as a fiber length L1, and the size of the fiber F in the shorter side direction can be referred to as a width L2. The width L2 corresponds to a fiber diameter. In the present embodiment, the direction of the fiber length L1 of the fiber F will be referred to as the orientation direction DF. The orientation direction DF indicates the direction of one piece of fiber F.

The fiber orientation direction DS in the sheet-shaped web S1 can be obtained by integrating the orientation directions DF of the plurality of fibers F contained in the sheet-shaped web S1. For example, a predetermined number of fibers F are extracted from the fibers F forming the sheet-shaped web S1, an average orientation of the orientation directions DF of the plurality extracted fibers F is obtained, and the obtained orientation can be regarded as the fiber orientation direction DS in the sheet-shaped web S1.

As a method for obtaining the fiber orientation direction DS, the present inventors used a digital microscope (VHX5000 manufactured by KEYENCE CORPORATION) to observe the surface of the sheet-shaped web S1 or the sheet-shaped web S2, which will be described later, under conditions of equal to or greater than 200-fold magnification and equal to or less than 500-fold magnification. The present inventors randomly selected 50 fibers F from the fibers F observed with the digital microscope, measured the orientation directions DF with respect to the observed surfaces, calculated an average value, and regarded the average value as the fiber orientation direction DS.

More specifically, it is possible to obtain a proportion of the number of fibers in a predetermined direction by setting the number of fibers F with orientation directions DF being the predetermined direction to T1, setting the number of fibers F with orientation directions DF being different from the predetermined direction to T2, and obtaining T1/T2. Then, the predetermined direction in which the proportion of the number of fibers is the largest can be regarded as the fiber orientation direction DS in the sheet-shaped web S1.

An example of the fiber orientation direction DS in the sheet-shaped web S1 is indicated by the reference sign C in FIG. 3. The sheet-shaped web S1 has a smaller size in the Z direction indicating the thickness than the size in the X-Y plane. Therefore, the fiber orientation direction DS in the sheet-shaped web S1 is the direction within the X-Y plane as illustrated in FIG. 3 in most cases. The fiber orientation direction DS can be fiber orientation directions DS3 and DS4 that are inclined with respect to the X axis and the Y axis or other directions in addition to a fiber orientation direction DS1 that is parallel to the Y axis and a fiber orientation direction DS2 that is parallel to the X axis. In other words, it is possible to state that the fiber orientation direction DS is the plane direction of the sheet-shaped web S1.

Further, a method of matching the orientation directions DF of a lot of fibers F with the fiber orientation direction DS in the sheet-shaped web S1 can be exemplified. FIG. 4 is an explanatory diagram of a fiber orientation direction DS in a sheet-shaped web S2. The sheet-shaped web S2 is a member cut out from a laminated body 201 in which a plurality of sheet-shaped webs S1 are laminated along a cutting plane CU so as to have a sheet shape.

The laminated body 201 is formed by laminating a plurality of sheet-shaped webs S1 or folding the sheet-shaped web S1 so that a plurality of layers are in an overlapping state and subjecting the laminated sheet-shaped webs S1 or the folded sheet-shaped web S1 to a joining process. The joining process is a press process, a pressurizing process and a heating process, a heating process in an oven or a furnace, an adhesive process with an adhesive, or the like.

In the sheet-shaped web S2, the fibers F extending in the X direction is cut into short lengths due to the laminated body 201 being cut in the Y-Z plane. Also, the laminated body 201 does not contain long fibers F extending in the Z direction. Therefore, the fiber orientation direction DS in the sheet-shaped web S2 is parallel to the Y-axis direction in the drawing, and most of the fibers F that do not follow the fiber orientation direction DS are short fibers.

In the sheet-shaped web S2, the orientation directions DF of a lot of fibers F are parallel to the fiber orientation direction DS, and the orientation directions DF are in a well-ordered state.

Hereinafter, such a sheet-shaped web S1 and the sheet-shaped web S2 will be collectively referred to as a sheet-shaped web S.

Next, a buffering function and the fiber orientation direction DS of the sheet-shaped web S will be described.

FIG. 5 is a diagram illustrating a configuration of a test piece used for a buffering function test. Here, the buffering function refers to an action of absorbing or mitigating an impact such that when an impact is applied to the sheet-shaped web S, the impact is not transmitted from the sheet-shaped web S to another object.

The present inventors produced a test piece 210 and a test piece 220 using the sheet-shaped web S and measured stress and compressibility when an external force was applied to the test pieces 210 and 220. As a comparison target, a test piece 230 made of styrofoam was produced, and measurement similar to that for the test pieces 210 and 220 was conducted. FIG. 5 illustrates the test pieces 210, 220, and 230, and the direction in which the external force is applied in the test is indicated as PW.

The test piece 210 has a substantially rectangular parallelepiped shape and has a surface 211 to which the external force PW is applied in the test. The fiber orientation direction DS in the test piece 210 intersects the direction of the external force PW at an angle of greater than 45 degrees and is typically perpendicular thereto. In other words, the fiber orientation direction DS is orthogonal to the normal line of the surface 211. The density of the test piece 210 was 0.15, and the content of the resin of the additive material AD contained in the test piece 210 was 30% by weight.

The test piece 220 has a substantially rectangular parallelepiped shape and has a surface 221 to which an external force PW is applied in the test. The fiber orientation direction DS in the test piece 220 forms an angle within 45 degrees with respect to the direction of the external force PW and is typically parallel thereto. In other words, the fiber orientation direction DS is parallel to the normal line of the surface 211. The density of the test piece 220 was 0.15, and the content of the resin of the additive material AD contained in the test piece 220 was 30% by weight.

The test piece 210 and the test piece 220 can be manufactured by laminating and joining the sheet-shaped webs S.

The test piece 230 is an object with a substantially rectangular parallelepiped shape made of styrofoam and has a surface 231 to which the external force PW is applied in the test.

FIG. 6 is a graph illustrating test results of the buffering function. The horizontal axis in FIG. 6 represents the compressibility while the vertical axis represents the stress. The compressibility indicates the amount of compression of the test pieces 210, 220, and 230 in the external force PW direction due to the application of the external force PW as proportions to the sizes of the test pieces 210, 220, and 230. The stress is a stress of the test pieces 210, 220, and 230 against the external force PW.

A curve 251 in FIG. 6 is a compressibility-stress curve of the test piece 210, and a curve 252 is a compressibility-stress curve of the test piece 220. A curve 253 is a compressibility-stress curve of the test piece 230.

Also, FIG. 6 illustrates a curve 254 which is a compressibility-stress curve of a test piece as a control example. The curve 254 is an example using a test piece in which the orientation directions DF of the fibers F are disordered, that is, the orientation directions DF are not biased in a specific direction or have a small bias. This test piece is configured of the sheet-shaped web S1 manufactured at a low density by the sheet manufacturing apparatus 100 such that the orientation directions DF are dispersed, has a density of 0.09, and contains 33% by weight of the resin of the additive material AD.

The curves 251 and 254 indicate increases in stress with increases in compressibility. In other words, since the stress against the external force PW increases as the surface 211 is depressed due to the external force PW, the surface 211 is compressed by the external force PW and has a higher density.

On the other hand, the curve 253 indicates a small increase in stress with an increase in compressibility. In other words, the test piece 230 made of styrofoam has a trend that the stress does not increase even when the surface 231 is deformed and depressed due to the external force PW. The curve 252 indicates a trend similar to the curve 253 as a whole and indicates a trend that an increase in stress with respect to an increase in compressibility is small.

Based on the results of the curves 252 and 253, the test piece 220 and the test piece 230 are deformed when a pressing force or an impact is applied thereto from the outside, but have a trend that the stress does not increase or is unlikely to increase during the deformation process. Therefore, it is possible to state that even if a packaging material or a storage container is deformed or destroyed when an external force or an impact is applied in a state in which an accommodated article is accommodated in the packaging material or the storage container using materials similar to those of the test piece 220 and the test piece 230, the force is unlikely to be applied to the accommodated article. A storage container made of styrofoam is evaluated to have an excellent buffering function, and the test piece 220 is similarly suitable for manufacturing a packaging material or a storage container having an excellent buffering function. On the other hand, it is possible to state based on the result of the curve 251 that when an external force or an impact is applied to a packaging material or a storage container configured of a material similar to that of the test piece 210 in a state in which an accommodated article is accommodated therein, the force or the impact is likely to be applied to the accommodated article as well.

FIG. 7 is a schematic view illustrating expression states of the buffering functions of the test pieces 210, 220, and 230.

As illustrated in FIG. 7, it is considered that the test piece 210 was compressed by the external force PW in a state in which the fiber F overlapped each other, the hardness and the rigidity thus increased as the compressibility increased, and the stress was expressed. On the other hand, it is considered that the fiber F in the test piece 220 that received the external force PW moved in the DV direction so as to avoid the external force PW, and the entire test piece 220 was thus largely deformed and yielded to the external force PW. In this case, since an impact energy of the external force PW is consumed to disaggregate the fiber contained in the test piece 220 from a state in which the fibers are bonded with the bonding material with the deformation of the test piece 220, the external force PW is mitigated or absorbed. Also, since the test piece 220 is deformed in a direction different from the external force PW, the density of the test piece 220 is unlikely to increase even when the external force PW is applied thereto. Therefore, an increase in stress with the deformation is unlikely to occur. Also, it is considered that since the individual particles of the styrol resin in the test piece 230 made of styrofoam collapse due to the external force PW, rigidity of the entire test piece 230 does not change, and the stress is unlikely to increase.

As described above, the sheet-shaped web S can realize an excellent buffering function like a container made of styrofoam when the fiber orientation direction DS is parallel or almost parallel to the direction in which the external force PW or impact is applied. According to the knowledge of the present inventors, a high buffering function can be obtained when the fiber orientation direction DS forms an angle of equal to or greater than −45 degrees and equal to or less than +45 degrees with respect to the direction in which the external force PW or the impact acts.

Next, an accommodating body 30 that uses the sheet-shaped web S as described above as a buffering material will be described.

Figure 8:
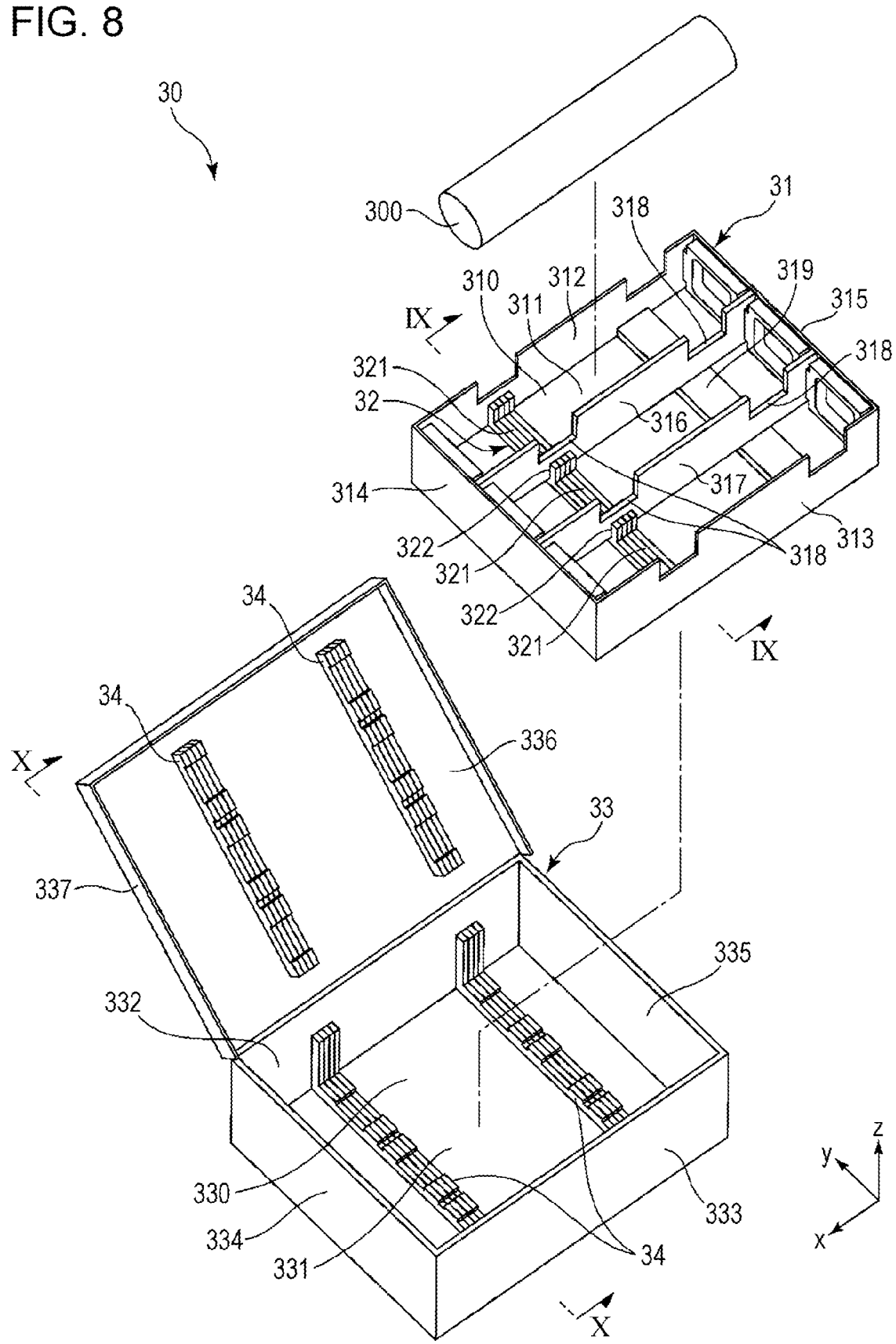
FIG. 8 is an exploded perspective view of the accommodating body of the present disclosure.
Figure 9:
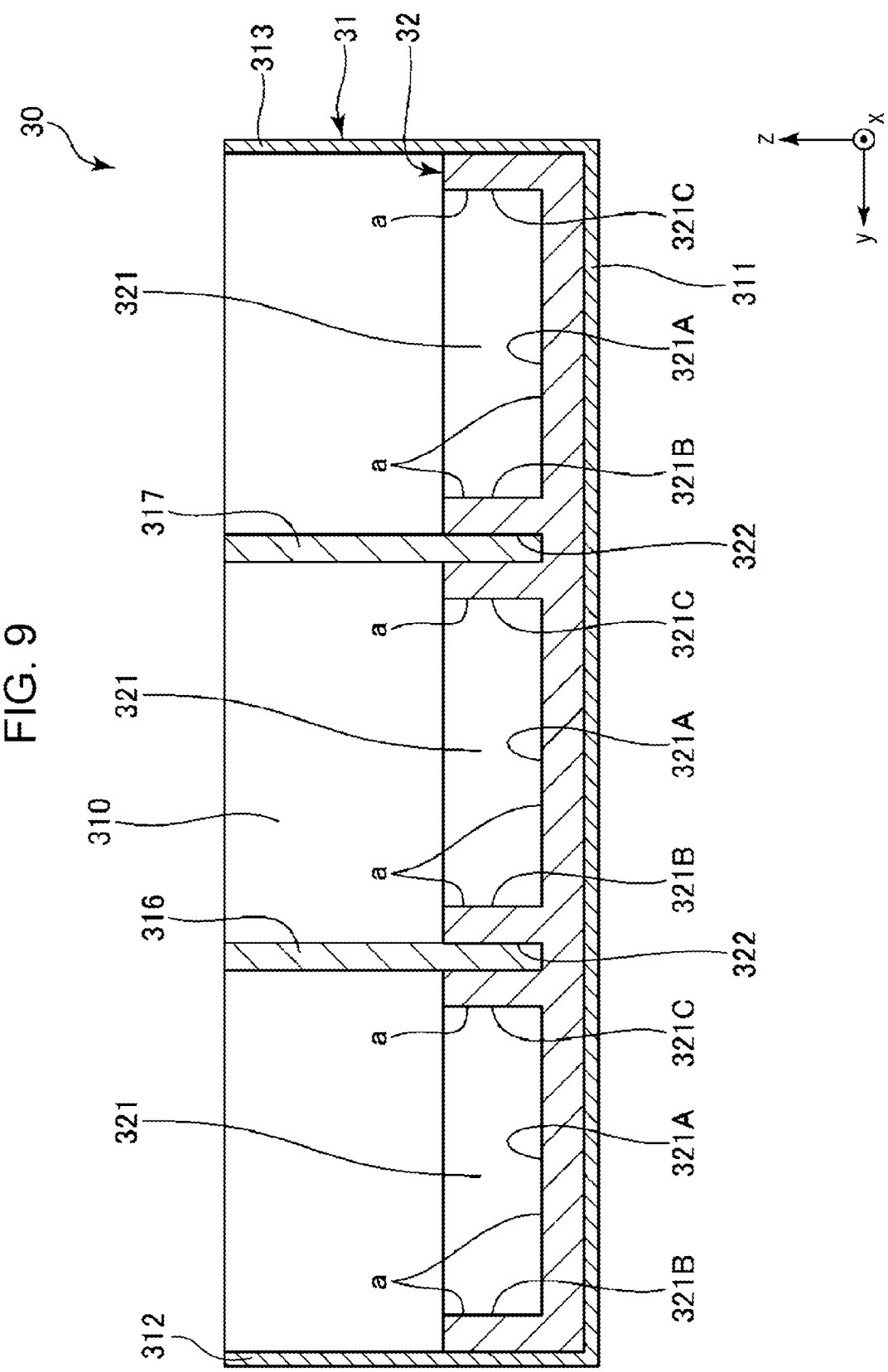
FIG. 9 is a sectional view along the line IX-IX in FIG. 8.
Figure 10:
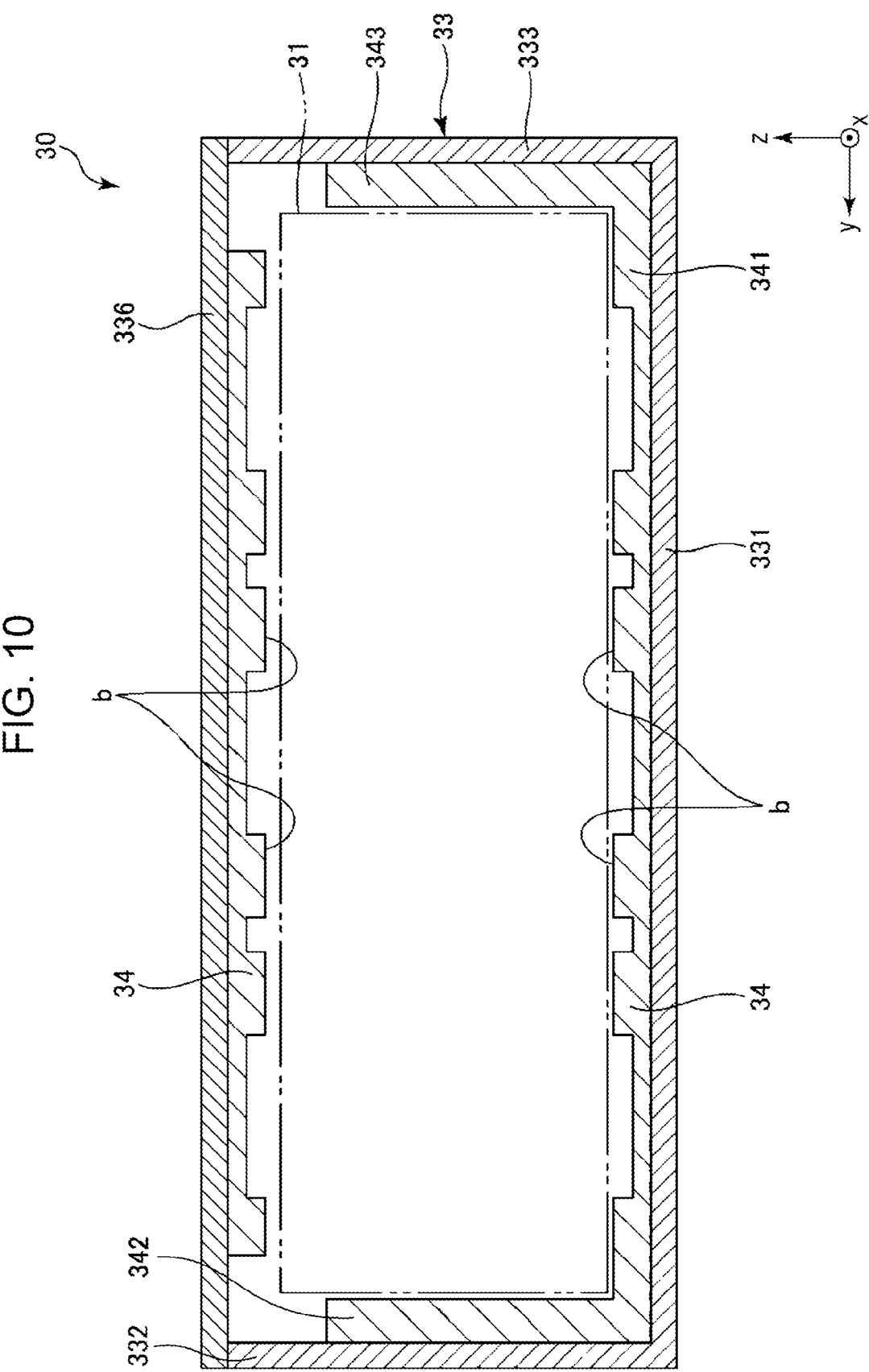
FIG. 10 is a sectional view along the line X-X in FIG. 8.
Figure 11:
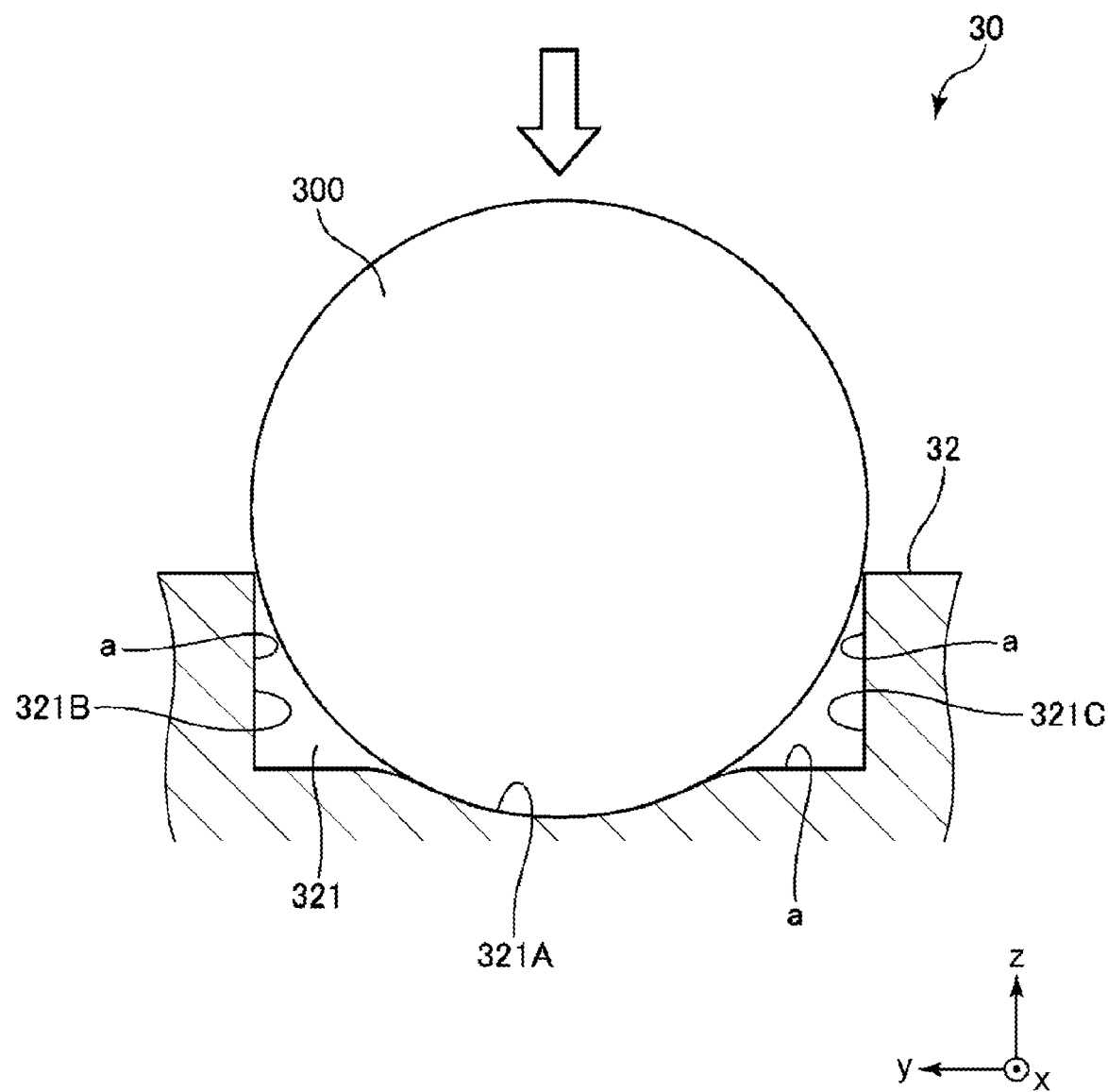
FIG. 11 is a schematic view illustrating an expression state of a buffering function in the first buffering material.
Figure 12:
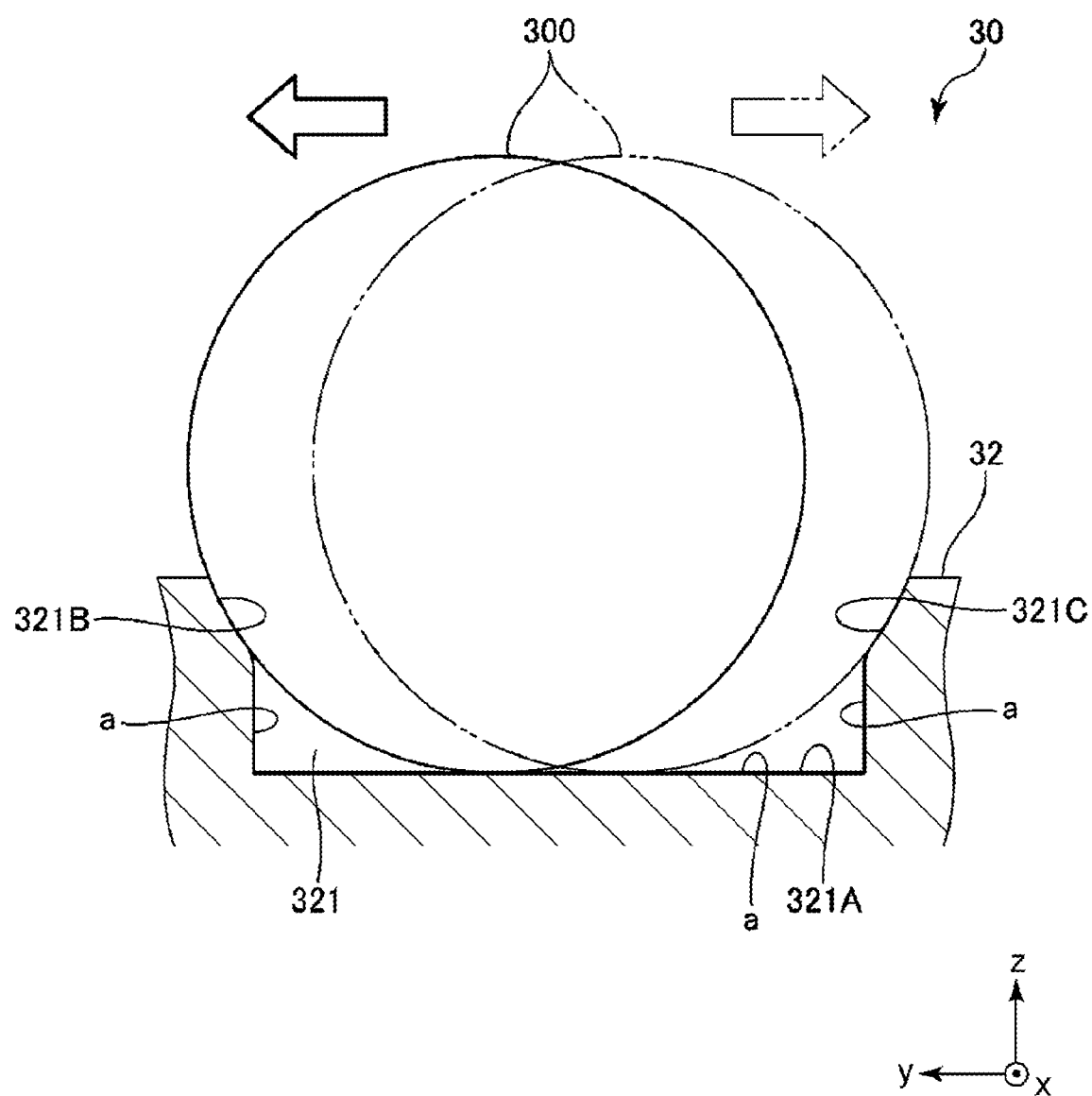
FIG. 12 is a schematic view illustrating an expression state of a buffering function in the first buffering material.

FIG. 8 is an exploded perspective view of the accommodating body according to the present disclosure. FIG. 9 is a sectional view along the line IX-IX in FIG. 8. FIG. 10 is a sectional view along the line X-X in FIG. 8. FIGS. 11 and 12 are schematic views illustrating an expression state of the buffering function in the first buffering material.

Also, FIGS. 8 to 10 illustrate an x axis, a y axis, and a z axis as three axes that are orthogonal to each other for convenience of explanation. In the following description, the direction that is parallel to the x axis will also be referred to as an "x-axis direction", the direction that is parallel to the y axis will also be referred to as a "y-axis direction", and the direction that is parallel to the z axis will also be referred to as a "z-axis direction". In the following description, the leading end side of each illustrated arrow will be referred to as "+ (positive)" while the base end side thereof will be referred to as "− (negative)".

In the following description, the +z-axis direction, that is, the upper side in FIGS. 8 to 12 will also be referred to as "above" or an "upper side" while the −z-axis direction, that is, the lower side therein will also be referred to as "below" or a "lower side", for convenience of explanation.

As illustrated in FIG. 8, the accommodating body 30 includes a first accommodating body 31, a first buffering material 32 provided in the first accommodating body 31, a second accommodating body 33, and second buffering materials 34. The first accommodating body 31 is a so-called inner box and accommodates a plurality of, in this embodiment, three accommodated articles 300. The second accommodating body 33 is a so-called outer box and accommodates the first accommodating body 31. In the illustrated configuration, the accommodated articles 300 are long objects, for example, bottles.

The first accommodating body 31 has a first bottom plate 311 that is a first bottom portion, four side walls 312, 313, 314, and 315 provided to stand from the first bottom plate 311 in the z-axis direction, and partitioning plates 316 and 317 as partitioning portions. The first bottom plate 311 has a rectangular shape in a plan view. The side walls 312 and 313 are provided along the long side of the first bottom plate 311, that is, along the x-axis direction and face each other in the y-axis direction. The side walls 314 and 315 are provided along the short side of the first bottom plate 311, that is, along the y-axis direction and face each other in the x-axis direction.

The space surrounded by the first bottom plate 311 and the side walls 312 to 315 is a first accommodation space 310 for accommodating the accommodated articles 300. In other words, the first accommodating body 31 has the first accommodation space 310.

The first accommodation space 310 is partitioned into three spaces by the partitioning plates 316 and 317. Each of the partitioning plates 316 and 317 is configured of a long plate member extending in the x-axis direction. Also, the partitioning plates 316 and 317 are provided so as to be separated from each other in the y-axis direction in an orientation with which the y-axis direction corresponds to the thickness direction thereof. Further, the partitioning plates 316 and 317 are disposed in this order from the +y-axis side. The partitioning plate 316 is disposed to be separated from the side wall 312 on the −y-axis side. The partitioning plate 317 is disposed to be separated from the side wall 313 on the +y-axis side.

The partitioning plates 316 and 317 have notches 318. In this embodiment, each of the partitioning plates 316 and 317 has two notches 318. The notches 318 are opened on the +z-axis side. It is possible to easily take out the accommodated articles 300 accommodated in the first accommodating body 31 with fingers inserted into the notches 318 when the accommodated articles 300 are taken out, by including the notches 318.

The partitioning plates 316 and 317 are supported and positioned by the first buffering material 32 and a reinforcing portion 319 as will be described later. The reinforcing portion 319 is configured of a long member that is disposed on the first bottom plate 311 and extends in the y-axis direction. The reinforcing portion 319 has a function of supporting the partitioning plates 316 and 317 and reinforcing strength of the first bottom plate 311.

Next, the first buffering material 32 will be described.

As illustrated in FIGS. 8 and 9, the first buffering material 32 is disposed on the first bottom plate 311 and has a function of mitigating impact applied to the accommodated articles 300 and protecting the accommodated articles 300 by coming into contact with the accommodated articles 300 accommodated in the first accommodating body 31. For example, the first buffering material 32 has a function of preventing or curbing collision between the first accommodating body 31 and the accommodated articles 300 and mitigating the impact even when the accommodated articles 300 are about to move due to inertial force with movement of the accommodating body 30.

The first buffering material 32 is a member that is formed by cutting the aforementioned sheet-shaped web S. Specifically, the first buffering material 32 is a member formed by cutting a portion surrounded by the dashed line in FIG. 3 or a portion surrounded by the dashed line in FIG. 4. The first buffering material 32 is disposed on the first bottom plate 311 with an orientation with which the fiber orientation direction DS follows the x-y plane. In other words, in the first buffering material 32, the sheet-shaped webs S are disposed with an orientation with which the thickness direction thereof follows the x-axis direction and end surfaces, that is, side surfaces thereof function as first pressure receiving surfaces a that come into contact with the accommodated articles 300 illustrated in FIG. 9.

In the illustrated configuration, four sheet-shaped webs S are disposed with an orientation with which the thickness directions thereof coincide with each other. In other words, the first buffering material 32 is configured of a laminated body in which the four sheet-shaped webs S are laminated in the x-axis direction.

In this manner, the first buffering material 32 is a laminated body, which has sheet-shaped webs S that are a plurality of first sheet-shaped webs, and in which the plurality of sheet-shaped webs S are laminated in the thickness direction. It is thus possible to increase the buffering effect.

Also, the first buffering material 32 is disposed on the first bottom plate 311 that is a first bottom portion. In this manner, it is possible to prevent excessive impact from being applied to the accommodated articles 300 even when impact of pressing the accommodated articles 300 against the first buffering material 32 from the +z-axis side to the −z-axis side is applied to the accommodating body 30, as will be described later.

As illustrated in FIGS. 8 and 9, the first buffering material 32 has a shape extending in the y-axis direction and is provided over the entire region of the first bottom plate 311 in the y-axis direction. Also, the first buffering material 32 has three positioning portions 321 and two support portions 322. In the first buffering material 32, the positioning portion 321, the support portion 322, the positioning portion 321, the support portion 322, and the positioning portion 321 are aligned in this order.

Each positioning portion 321 is a portion, which is configured of a notch opened on the +z-axis side, which the accommodated articles 300 enter. Portions of end surfaces of the sheet-shaped webs S facing the positioning portions 321 abut on the accommodated articles 300 at a plurality of locations, and it is thus possible to position the accommodated articles 300. In other words, it is possible to prevent the accommodated articles from excessively moving inside the first accommodation space 310.

In this manner, the first buffering material 32 has the positioning portions 321 that position the accommodated articles 300. It is thus possible to position the accommodated articles 300. Therefore, it is possible to prevent the accommodated articles 300 from excessively moving inside the first accommodation space 310.

In the embodiment, portions of the end surfaces of the sheet-shaped webs S facing the positioning portions 321 function as first pressure receiving surfaces a.

The support portions 322 are configured of notches opened in the +z-axis direction. Also, the width of the notches, that is, the length thereof in the y-axis direction is substantially the same as the thickness of the partitioning plates 316 and 317. In this manner, it is possible to stably support the partitioning plates 316 and 317 by inserting the partitioning plates 316 and 317 to the notches.

In this manner, the first accommodating body 31 has the partitioning plates 316 and 317 as partitioning portions for partitioning the inside, and the first buffering material 32 has the support portions 322 that support the partitioning plates 316 and 317. It is thus possible to stably support the partitioning plates 316 and 317.

Here, the first buffering material 32 is configured of the sheet-shaped webs S, and the sheet-shaped webs S are disposed in an orientation in which the x-axis direction corresponds to the thickness direction, as described above. In other words, the end surfaces of the sheet-shaped webs S function as the first pressure receiving surfaces a. In this embodiment, end surfaces 321A, 321B, and 321C of the end surfaces of the sheet-shaped webs S facing the positioning portions 321 serve as the first pressure receiving surfaces a as illustrated in FIG. 9.

In the sheet-shaped webs S, the fiber orientation direction DS follows the plane direction, that is, the y-z plane. Such a first buffering material 32 exhibits an excellent buffering function as follows.

First, a case in which such an impact that presses the accommodated articles 300 against the first buffering material 32 from the +z-axis side toward the −z-axis side is applied to the accommodating body 30, for example, will be described as illustrated in FIG. 11.

In this case, the fibers move in the +y-axis direction or the −y-axis direction to avoid the external force, and the first buffering material 32 is deformed such that the end surface 321A is curved toward the −z-axis side as described above, in the first buffering material 32. At the time of the deformation, the impact energy of the external force is consumed to disaggregate the fibers from the state in which the fibers are bonded by the bonding material, and the external force is mitigated and absorbed. As a result, the first buffering material 32 exhibits an excellent buffering function and can effectively protect the accommodated articles 300.

Next, a case in which such an impact of pressing the accommodated articles 300 against the first buffering material 32 in the y-axis direction has been applied to the accommodating body 30, for example, as illustrated in FIG. 12 will be described.

In this case, in the first buffering material 32, the fibers move in the +z-axis direction or the −z-axis direction to avoid external force as described above, and the first buffering material 32 is deformed such that the end surface 321B or the end surface 321C is curved toward the +y-axis side or the −y-axis side. At the time of this deformation, the impact energy of the external force PW is consumed in order to disaggregate the fibers from the state in which the fibers are bonded by the bonding material, and the external force is mitigated and absorbed. As a result, the first buffering material 32 exhibits an excellent buffering function and can effectively protect the accommodated articles 300.

As described above, the accommodating body 30 includes the first accommodating body 31 that has the first bottom plate 311 that is the first bottom portion and a first buffering material 32 that has the sheet-shaped webs S that are at least one first sheet-shaped webs that have the first pressure receiving surfaces a that come into contact with the accommodated articles 300 accommodated in the first accommodating body 31 and that contains the fibers and the bonding material that bonds the fibers. Also, the sheet-shaped webs S are adapted such that the fibers are oriented in the plane direction of the sheet-shaped webs S, and the first buffering material 32 is used with an orientation with which the end surfaces of the sheet-shaped webs S serve as the first pressure receiving surfaces a. In this manner, the first buffering material 32 can exhibit an excellent buffering function and can effectively protect the accommodated articles 300.

Next, the second accommodating body 33 and the second buffering materials 34 will be described.

As illustrated in FIG. 8, the second accommodating body 33 has a second bottom plate 331 as a second bottom portion, four side walls 332, 333, 334, and 335 provided to stand in the z-axis direction from the second bottom plate 331, and a lid body 336. The second accommodating body 33 is configured of a box body that has a second accommodation space 330 and has such a size with which the second accommodating body 33 can sufficiently accommodate the entire first accommodating body 31. The space surrounded by the second bottom plate 331, the side walls 332, 333, 334, and 335 and the lid body 336 is the second accommodation space 330.

The second bottom plate 331 has a rectangular shape in a plan view. The side walls 332 and 333 are provided along the long side of the second bottom plate 331, that is, along the x-axis direction and face each other in the y-axis direction. The side walls 334 and 335 are provided along the short side of the second bottom plate 331, that is, along the y-axis direction and face each other in the x-axis direction.

The lid body 336 is configured of a plate-shaped member having substantially the same shape as the second bottom plate 331. In this embodiment, the lid body 336 is joined to the edge portion of the side wall 332 on the +z-axis side and is configured to be rotatable around this joined portion as an axis. It is possible to open and close the second accommodation space 330 through the turning.

Also, the lid body 336 has a folded portion 337 obtained by folding the edge portion other than the portion joined to the side wall 332. In the state in which the lid body 336 is closed, the folded portion 337 overlaps with the side walls 333 to 335. It is thus possible to prevent dirt, dust, or the like from being mixed into the second accommodation space 330 from the outside in the state in which the lid body 336 is closed.

Note that the lid body 336 is not limited to the aforementioned configuration, may be joined to the side wall 333, may be joined to the side wall 334, or may be joined to the side wall 335, for example. Also, the lid body 336 may be configured as a separate element from the side walls 332 to 335. In addition, the lid body 336 may be omitted.

Two second buffering materials 34 are provided in each of the second bottom plate 331 as the second bottom portion and the lid body 336. Each second buffering material 34 is a member formed by cutting the aforementioned sheet-shaped web S similarly to the first buffering material 32. Also, the second buffering materials 34 are disposed on the second bottom plate 331 and the lid body 336 with an orientation with which the fiber orientation direction DS follows the x-y plane. In other words, in each second buffering material 34, the sheet-shaped webs S are disposed with an orientation with which the thickness directions thereof follow the x-axis direction, and end surfaces, that is, side surfaces function as second pressure receiving surfaces b that come into contact with the first accommodating body 31.

In this manner, the second buffering materials 34 have the sheet-shaped webs S that are at least one second sheet-shaped web that has the second pressure receiving surface b that comes into contact with the first accommodating body 31 and contains fibers and a bonding material that bonds the fibers. Also, the second buffering materials 34 are used in an orientation with which the end surfaces of the sheet-shaped webs S serve as the second pressure receiving surfaces b. In this manner, it is possible to exhibit an excellent buffering effect with a similar principle to that described for the first buffering material 32. Therefore, it is possible to effectively prevent excessive impact from being applied to the first accommodating body 31 and thus the accommodated articles 300.

In the illustrated configuration, four sheet-shaped webs S are disposed with an orientation with which the thickness directions thereof coincide with each other. In other words, each second buffering materials 34 is configured of a laminated body in which the four sheet-shaped webs S are laminated in the x-axis direction. It is thus possible to increase the buffering effect.

Also, the second buffering materials 34 disposed on the second bottom plate 331 have first portions 341 that come into contact with the second bottom plate 331, second portions 342 that come into contact with the side wall 332, and third portions 343 that come into contact with the side wall 333. In other words, the second buffering materials 34 are disposed on the second bottom plate 331, the side wall 332, and the side wall 333. In this manner, it is possible to exhibit an excellent buffering function when an impact of pressing the first accommodating body 31 against the second buffering materials 34 from the +z-axis side toward the −z-axis side is applied to the accommodating body 30 and when an impact of pressing the first accommodating body 31 against the second buffering materials 34 in the y-axis direction is applied to the accommodating body 30.

Note that although the second buffering materials 34 are disposed on the second bottom plate 331, the side wall 332, and the side wall 333 in this embodiment, the present disclosure is not limited thereto, and the second buffering materials 34 may be disposed on one or two of these.

Although the portions of the second buffering materials 34 disposed on the second bottom plate 331, the side wall 332, and the side wall 333 are integrally formed in the present embodiment, the present disclosure is not limited thereto, and these portions may be configured as separate elements.

In this manner, the second accommodating body 33 has the side walls 332 to 335 provided to stand from the second bottom plate 331 that is the second bottom portion. In addition, the second buffering materials 34 are disposed on at least one of the second bottom plate 331 and the side walls 332 to 335. It is thus possible to prevent or further effectively prevent an excessive impact from being applied to the first accommodating body 31 and thus the accommodated articles 300.

The second accommodating body 33 has the lid body 336, and the second buffering materials 34 are disposed on the lid body 336. In this manner, it is possible to exhibit an excellent buffering function when an impact of pressing the first accommodating body 31 against the second buffering materials 34 from the −z-axis side toward the +z-axis side is applied to the accommodating body 30.

As illustrated in FIGS. 8 and 10, the second buffering materials 34 disposed on the lid body 336 are disposed to overlap the second buffering materials 34 disposed on the second bottom plate 331 when seen in the z-axis direction in a state in which the lid body 336 is closed. It is thus possible to sandwich the first accommodating body 31 from the +z-axis side and the −z-axis side with the second buffering materials 34. Therefore, it is possible to stably retain the first accommodating body 31.

The second buffering materials 34 have unevenness formed at portions at which the second buffering materials 34 come into contact with the first accommodating body 31. In this manner, it is possible to deform projecting portions of the second buffering materials 34 with priority when the first accommodating body 31 is pressed against the second buffering materials 34. Therefore, it is possible to further effectively exhibit the buffering function.

In this manner, the accommodating body 30 includes the second accommodating body 33 that has the second bottom plate 331 that is the second bottom portion and accommodates the first accommodating body 31 and the second buffering materials 34 that come into contact with the first accommodating body 31 accommodated in the second accommodating body 33. In this manner, it is possible to further effectively prevent excessive impact from being applied to the first accommodating body 31 and thus the accommodated articles 300.

Note that although the material configuring the first accommodating body 31 and the second accommodating body 33 is not particularly limited, the first accommodating body 31 and the second accommodating body 33 are preferably configured of fibers as described above, that is, the first accommodating body 31 and the second accommodating body 33 are preferably configured of fibers manufactured by the sheet manufacturing apparatus 100 described above. It is thus possible to incinerate and dispose the entire accommodating body 30 when the accommodating body 30 is discarded.

Although the second buffering materials 34 are disposed in the second accommodating body 33 in an orientation with which the fiber orientation direction DS follows the x-y plane similarly to the first buffering material 32, the present disclosure is not limited thereto, and the second buffering materials 34 may be disposed in the second accommodating body 33 with an orientation in which the fiber orientation direction DS follows a plane that is different from the x-y plane. Also, the second buffering materials 34 may be small pieces or the like obtained by cutting a buffering material with a configuration that is different from the aforementioned configuration, for example, styrofoam or a sheet.

Although the accommodating body according to the present disclosure has been described above based on the illustrated embodiment, the present disclosure is not limited thereto, and the configuration of each part may be replaced with an arbitrary configuration with a similar function. Also, other arbitrary configurations may be added to the accommodating body according to the present disclosure.

Note that although each of the first accommodating body and the second accommodating body is configured to have four side walls in the aforementioned embodiment, the present disclosure is not limited thereto, and one or a plurality of the four side walls may be omitted, for example.

The first accommodating body and the second accommodating body may have shapes like trays with lengths of the side walls in the z-axis direction that are shorter than those in the illustrated configurations.

Second Embodiment

Figure 13:
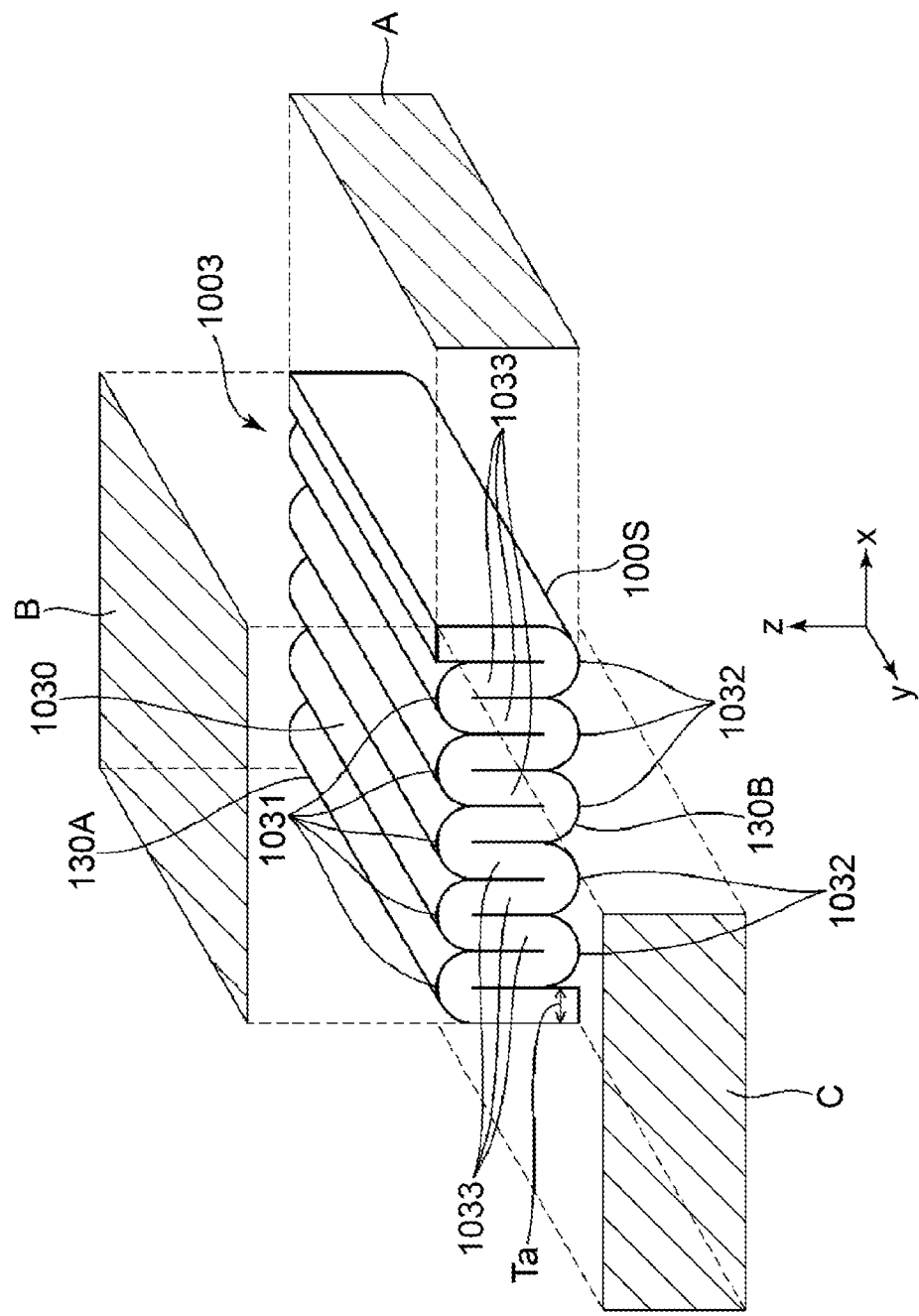
FIG. 13 is a perspective view of a second embodiment of a buffering material according to the present disclosure.
Figure 14:
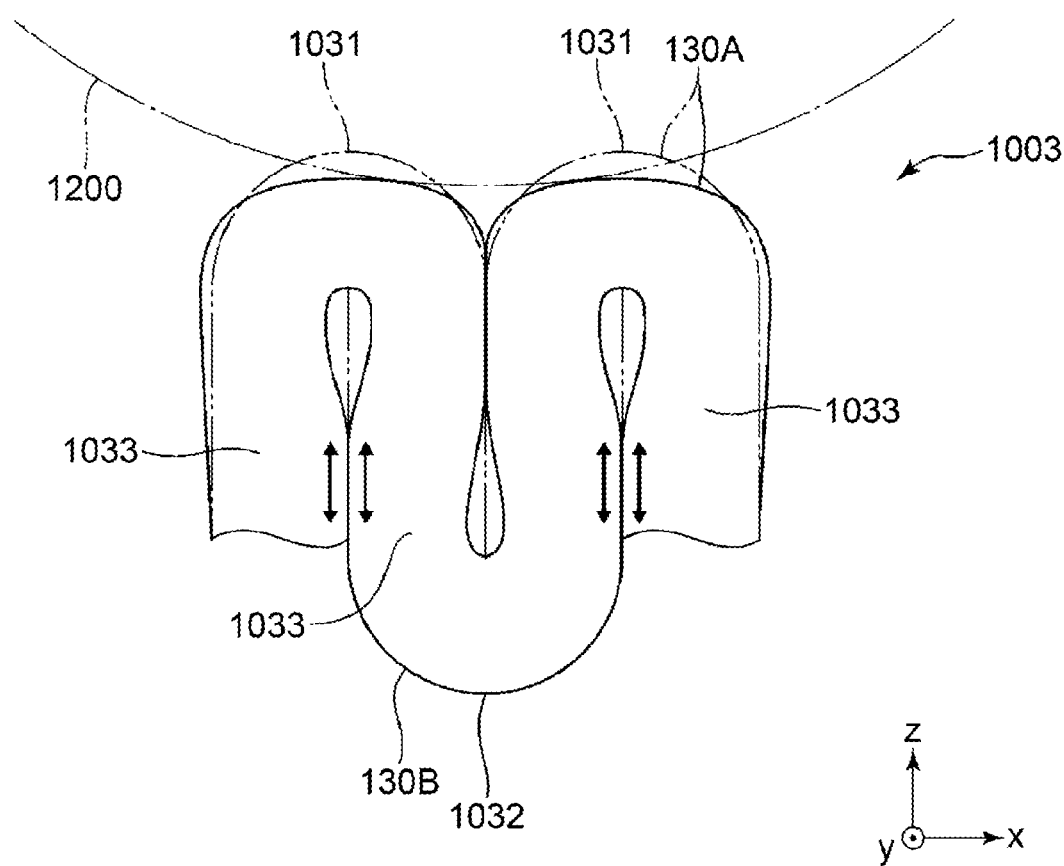
FIG. 14 is a partially enlarged sectional view of the buffering material illustrated in FIG. 13.
Figure 15:
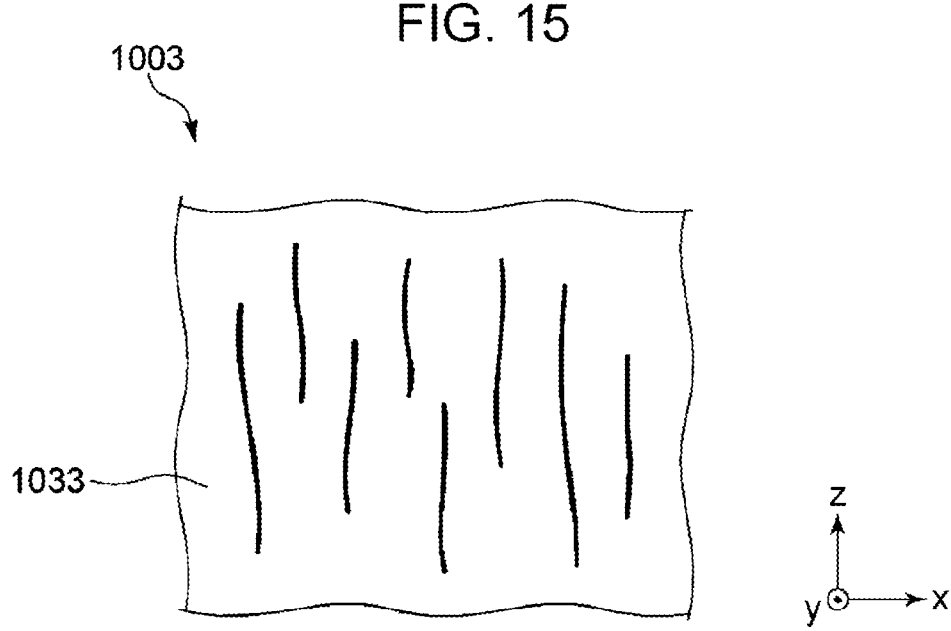
FIG. 15 is a diagram for explaining the buffering function and is a partially enlarged sectional view of the buffering material illustrated in FIG. 13.
Figure 16:
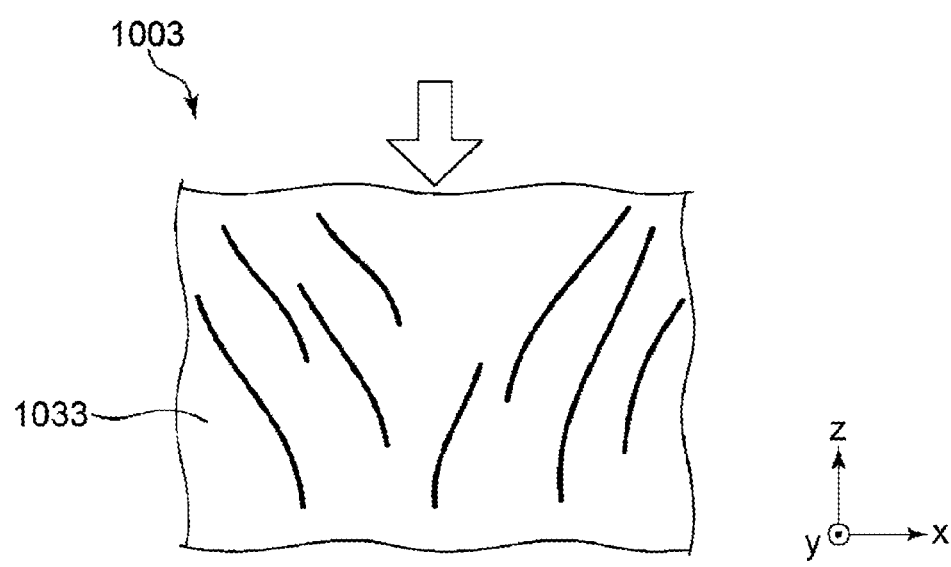
FIG. 16 is a diagram for explaining a buffering function and is a partially enlarged sectional view of the buffering material illustrated in FIG. 13.

FIG. 13 is a perspective view of a second embodiment of a buffering material according to the present disclosure. FIG. 14 is a partially enlarged sectional view of the buffering material illustrated in FIG. 13. FIG. 15 is a diagram for explaining a buffering function and is a partially enlarged sectional view of the buffering material illustrated in FIG. 13. FIG. 16 is a diagram for explaining the buffering function and is a partially enlarged sectional view of the buffering material illustrated in FIG. 13.

In the following description, the upper side in FIG. 13 will also be referred to as "above" or an "upper side" while the lower side therein will also be referred to as "below" or a "lower side" for convenience of explanation.

FIGS. 13 to 16 illustrate an x axis, a y axis, and a z axis as three axes that are orthogonal to each other for convenience of explanation. In the following description, the direction that is parallel to the x axis will also be referred to as an "x-axis direction", the direction that is parallel to the y axis will also be referred to as a "y-axis direction", and the direction that is parallel to the z axis will also be referred to as a "z-axis direction". In the following description, the leading end side of each illustrated arrow will be referred to as "+ (positive)" while the base end side thereof will be referred to as "− (negative)".

First, a buffering material 1003 will be described.

The buffering material 1003 can be manufactured by a buffering material manufacturing apparatus 1100, which will be described later. The buffering material 1003 is configured of a material containing fibers and a bonding material that binds the fibers. In other words, the buffering material 1003 is obtained by molding a sheet-shaped web 100S manufactured by the buffering material manufacturing apparatus 1100.

Examples of the fibers contained in the material configuring the buffering material 1003 include a plant-derived fibers, animal-derived fibers such as wool, resin fibers such as polyamide, tetoron, rayon, cupra, acetate, vinylon, acryl, polyethylene terephthalate, and aramid, glass fibers, carbon fibers, and the like, and mixtures of one or two or more of these fibers.

Among these, the fibers are preferably plant-derived fibers.

Examples of the plant-derived fibers include cellulose fibers, cotton, linters, kapoks, flax, *cannabis*, ramie, silk, and the like, and it is possible to use one of these or to use a combination of two or more thereof. In particular, it is preferable to mainly contain cellulose fiber. Cellulose fibers can be easily obtained and have excellent moldability into a wave shape.

As the cellulose fibers, cellulose fibers derived from wood-based pulp is preferably used. Examples of wood-based pulp include virgin pulp, kraft pulp, bleached chemithermo-mechanical pulp, synthetic pulp, pulp derived from waste paper and recycled paper, and the like, and it is possible to use one of these or to use a combination of two or more thereof. Here, the cellulose fibers may be any fibers that contain, as a main component, cellulose as a compound, that is, cellulose in a narrow sense and that have a fiber form, and cellulose fibers that contain hemicellulose or lignin corresponds thereto in addition to the cellulose in the narrow sense.

The average fiber length of the fibers is not particularly limited, is preferably equal to or greater than 0.5 mm and equal to or less than 100 mm, and is more preferably equal to or greater than 0.5 mm and equal to or less than 50 mm. In this manner, binding is satisfactorily achieved by the bonding material, which will be described later, and excellent moldability into the sheet-shaped web 100S and excellent moldability into the wave shape are achieved. In addition, it is possible to obtain appropriate rigidity after the molding and to satisfactorily exhibit the buffering function.

The average fiber width of the fibers is not particularly limited, is preferably equal to or greater than 5 μm and equal to or less than 50 μm, and is more preferably equal to or greater than 7 μm and equal to or less than 40 μm. In this manner, binding is satisfactorily achieved by the bonding material, which will be described later, and excellent moldability into the sheet-shaped web 100S and excellent moldability into the wave shape are achieved. In addition, it is possible to obtain appropriate rigidity after the molding and to satisfactorily exhibit the buffering function.

For similar reasons, the average aspect ratio of the plant-derived fibers, that is, the ratio of the average length with respect to the average width thereof is preferably equal to or greater than 3 and equal to or less than 600 and is more preferably equal to or greater than 10 and equal to or less than 400.

Note that the fiber length and the fiber width can be obtained by performing measurement by using a fiber tester (manufactured by Lorentzen & Wettre), for example, and calculating a length weighted average value therefrom.

The content of the fibers in the material configuring the buffering material 1003 is not particularly limited, is preferably equal to or greater than 50% by weight and equal to or less than 80% by weight, and is more preferably equal to or greater than 60% by weight and equal to or less than 75% by weight. With such content, excellent moldability into the sheet-shaped web 100S and excellent moldability into the wave shape are achieved. In addition, it is possible to obtain appropriate rigidity after the molding and to satisfactorily exhibit the buffering function.

Also, the content of the plant-derived fibers, particularly, cellulose fibers in the entire fibers in the material configuring the buffering material 1003 is not particularly limited, is preferably equal to or greater than 60% by weight and equal to or less than 100% by weight, and is more preferably equal to or greater than 75% by weight and equal to or less than 100% by weight.

The material configuring the buffering material 1003 preferably contains a binding resin as a bonding material that binds the fibers. As the binding resin, it is possible to use either a thermoplastic resin or a curable resin, and a binding resin mainly using a thermoplastic resin is preferably used. Examples of the thermoplastic resin include polyolefins such as an AS resin, an ABS resin, polyethylene, polypropylene and an ethylene-vinyl acetate copolymer (EVA), modified polyolefins, acrylic resins such as polymethylmethacrylate, polyvinyl chloride, polystyrene, polyester such as polyethylene terephthalate and polybutylene terephthalate, polyamides such as nylon 6, nylon 46, nylon 66, nylon 610, nylon 612, nylon 11, nylon 12, nylon 6-12, and nylon 6-66 (nylon: registered trademark), polyamideimide, polyphenylene ether, polyacetal, polyether, polyphenylene oxide, modified polyphenylene ether, polyether ether ketone, polycarbonate, polyphenylene sulfide, thermoplastic polyimide, polyetherimide, liquid crystal polymers such as aromatic polyester, fluorine resins such as polytetrafluoroethylene, and various thermoplastic elastomers such as a styrene-based elastomer, a polyolefin-based elastomer, a polyvinyl chloride-based elastomer, a polyurethane-based elastomer, a polyester-based elastomer, a polyamide-based elastomer, a polybutadiene-based elastomer, a transpolyisoprene-based elastomer, a fluororubber-based elastomer, and a chlorinated polyethylene-based elastomer, and it is possible to use one of these or to use a combination of two or more thereof. Particularly preferable thermoplastic resins include polyester and resins containing polyester. Examples of the thermoplastic resins may include biomass plastic and biodegradable plastic such as a polylactic acid, polycaprolactone, modified starch, polyhydroxybutyrate, polybutylene succinate, and polybutylene succinate adipate. This improves environmental compatibility. Also, the binding resin may contain a curable resin such as a thermosetting resin or a photosetting resin. Examples of the thermosetting resin may include an epoxy resin and a phenol resin, and the thermosetting resin may contain one of these or two or more thereof.

The form of the bonding material contained in the material configuring the buffering material 1003 is not particularly limited and preferably the bonding material is added in the form of particles. Particularly, the bonding material is preferably added as powder with an average particle diameter of equal to or greater than 1 µm and equal to or less than 500 µm and is more preferably as powder with an average particle diameter of equal to or greater than 3 µm and equal to or less than 400 µm. In this manner, the resin is likely to be uniformly dispersed in the fibers, and it is possible to obtain the buffering material 1003 with no irregularity in rigidity and a buffering function.

Note that it is possible to use a mean volume diameter (MVD) measured using a laser diffraction-type particle size distribution measurement apparatus, for example, as the average particle diameter of the particles. The particle size distribution measurement apparatus using a laser diffraction and scattering method as a measurement principle, that is, the laser diffraction-type particle size distribution measurement apparatus can measure particle size distribution on a volume basis.

The content of the bonding material in the material configuring the buffering material 1003 is preferably equal to or greater than 20% by weight and equal to or less than 40% by weight, is more preferably equal to or greater than 25% by weight and equal to or less than 35% by weight, and is further preferably equal to or greater than 27% by weight and equal to or less than 32% by weight. In this manner, excellent moldability into a wave shape is achieved. In other words, it is possible to prevent wrinkles and breakage from occurring at the time of the molding while satisfactorily binding the fibers with no irregularity. Also, the obtained buffering material 1003 has sufficient strength and an excellent buffering function.

The material configuring the buffering material 1003 may contain components other than the fibers and the bonding material. For example, the following additives are exemplified. Examples of the additives include a neutralizing agent, a fixing agent, a viscous agent, a sizing agent, a paper strengthening agent, a defoaming agent, a water retaining agent, a water resistant agent, an aggregation inhibitor for curbing fiber aggregation and resin aggregation, colorants such as carbon black and white pigments, flame retardants, and the like.

The density of the material configuring such a buffering material 1003 is preferably equal to or greater than 0.5 g/cm$^3$ and equal to or less than 2.0 g/cm$^3$ and is more preferably equal to or greater than 0.7 g/cm$^3$ and equal to or less than 1.8 g/cm$^3$. In this manner, it is possible to effectively prevent wrinkles or breakage from occurring at the time of molding the buffering material 1003, and the obtained buffering material 1003 has sufficient strength, has appropriate impact absorption properties, and is excellent as a buffering material.

As illustrated in FIG. 13, an average thickness Ta of the sheet-shaped web 100S is not particularly limited, is preferably equal to or greater than 0.15 mm and equal to or less than 2.0 mm, and is more preferably equal to or greater than 0.2 mm and equal to or less than 1.7 mm. In this manner, the buffering material 1003 has sufficient rigidity.

Here, as illustrated in FIG. 13, the buffering material 1003 has a molded article 1030 obtained by molding the sheet-shaped web 100S, which has a first surface 1030A and a second surface 1030B opposite to each other, into a wave shape. Specifically, the molded article 1030 has first curved portions 1031, second curved portions 1032, and intermediate portions 1033. The overall shape of the molded article 1030 is a block shape in the illustrated configuration. However, the shape is not limited thereto and may be any shape such as a plate shape, a block shape, or a box shape, for example.

The first curved portions 1031 are located on the +z-axis side. The first curved portions 1031 are portions of the folded sheet-shaped web 100S so as to project on the side of the first surface 1030A. Five first curved portions 1031 are provided in the illustrated configuration, and these are aligned in the x-axis direction. Note that it is only necessary to provide at least one first curved portion 1031 and the number thereof may not be limited to that in the illustrated configuration.

The second curved portions 1032 are located on the −z-axis side. The second curved portions 1032 are portions of the folded sheet-shaped web 100S so as to project on the side of the second surface 1030B. Also, five second curved portions 1032 are provided in the illustrated configuration, and these are aligned in the x-axis direction. The positions of the first curved portions 1031 and the second curved portions 1032 deviate from each other in the x-axis direction. The amount of deviation corresponds to a half pitch. Note that it is only necessary to provide at least one second curved portion 1032 and the number thereof is not limited to that in the illustrated configuration.

In this embodiment, such first curved portions 1031 or second curved portions 1032 function as pressure receiving portions that come into contact with a buffering target 1200 illustrated in FIG. 14.

The intermediate portions 1033 are located between the first curved portions 1031 and the second curved portions 1032. In the intermediate portions 1033, the sheet-shaped web 100S is disposed in an orientation with which the x-axis direction corresponds to the thickness direction thereof. Therefore, in the intermediate portions 1033, the fibers are oriented the direction that intersects the plane direction of the y-z plane, that is, the plane direction of the molded article 1030. "The fibers are oriented in the direction that intersects the plane direction of the molded article 1030" means that a main orientation direction of the fibers is the thickness direction of the molded article 1030, that is, the direction that follows the plane direction of the sheet-shaped web 100S before the molding. In other words, it is possible to state that in the intermediate portions, the fibers are oriented in the plane direction of the first surface 1030A and the second surface 1030B at the intermediate portions 1033.

More specifically, the degree of orientation in the x-axis direction is lower than the degree of orientation in the y-axis direction and the degree of orientation in the Z-axis direction. Then, the fibers are randomly oriented in the y-z plane. However, the degree of orientation in the z-axis direction may be larger than the degree of orientation in the y-axis direction.

As a method for obtaining the orientation direction of the fibers, the surface of the sheet-shaped web 100S or a sheet-shaped web 10S2, which will be described later, is observed under conditions of equal to or greater than 200-fold magnification and equal to or less than 500-fold magnification using a digital microscope (VHX5000 manufactured by KEYENCE CORPORATION). Also, fifty fibers are randomly selected from the fibers observed with the digital microscope, orientation directions with reference to the observed surface are measured, and an average value thereof is calculated and regarded as an orientation direction of the fibers.

This will be described from another viewpoint. The proportion of the number of fibers in a predetermined direction can be obtained by obtaining T1/T2 on the assumption that the number of fibers that have orientation directions in a predetermined orientation direction is T1 and the number of fibers that have orientation directions different from the predetermined direction is T2. Then, a predetermined direction at which a maximum proportion of the number of fibers is obtained can be regarded as the orientation direction of the fibers in the sheet-shaped web 100S.

Also, the sheet-shaped web 100S is laminated in plural in the thickness direction thereof at the intermediate portions 1033. Adjacent intermediate portions 1033 are not secured in this embodiment. However, the present disclosure is not limited thereto, and the adjacent intermediate portions 1033 may be secured. Note that although the securing method is not particularly limited, examples thereof include methods such as adhesion, pressure bonding, fusion, securing via a securing member, and the like.

The sheet-shaped web 100S is laminated in the thickness direction of the sheet-shaped web 100S at the intermediate portions 1033. In this manner, it is possible to increase the buffering function as will be described later in accordance with the number of laminated layers and to further increase a range in the buffering material 1003 that exhibits the buffering function.

Next, the buffering function of the buffering material 1003 will be described. Hereinafter, a case in which a buffering target 1200 is pressed against the buffering material 1003 from the +z-axis direction will be described. Note that the buffering function that is similar to that described below can be exhibited even when the buffering target is pressed against the buffering material 1003 from the −z-axis direction.

As illustrated in FIG. 14, when the buffering target 1200 is pressed against the buffering material 1003 from the +z-axis direction, the first curved portions 1031 are deformed to collapse first. Since the first curved portions 1031 have a curved shape, the first curved portions 1031 are likely to be deformed and have an excellent buffering function. The same also applies to the second curved portions 1032.

Next, impact from the buffering target 1200 is transmitted to the intermediate portions 1033. In the intermediate portions 1033, the fibers are oriented in the plane direction of the y-z plane as described above. Therefore, when an external force is applied to the intermediate portions 1033 from the +z-axis side, the fibers with an orientation in the z-axis direction, in particular, move on the ±x-axis sides or the ±y-axis sides to avoid the external force. Impact energy of the external force is consumed by the movement of the fibers to disaggregate the fibers from a state in which the fibers are bonded by the bonding material, and the external force is mitigated and absorbed. As a result, it is possible to exhibit an excellent buffering function.

Further, since the fibers move in a direction that is different from the direction in which the fibers have received the external force, the density of the fibers is unlikely to increase. Therefore, it is possible to sufficiently exhibit a buffering function even when the buffering material 1003 is repeatedly used.

Due to the synergistic effects of the buffering functions of the first curved portions 1031 and the second curved portions 1032 and the buffering function of the intermediate portions 1033 as described above, the buffering material 1003 can exhibit an excellent buffering function. Since the buffering material 1003 is manufactured by the buffering material manufacturing apparatus 1100, which will be described later, there are no adverse effects on an environment, and excellent recyclability can also be achieved.

In this manner, the buffering material 1003 is configured of the molded article 1030 obtained by molding the sheet-shaped web 100S that contains the fibers and the bonding material that bonds the fibers and that has the first surface 1030A and the second surface 1030B opposite to each other. Also, the molded article 1030 is molded into a wave shape that has the first curved portions 1031 projecting on the side of the first surface 1030A, the second curved portions 1032 projecting on the side of the second surface 1030B, and the intermediate portions 1033 located between the first curved portions 1031 and the second curved portions 1032. Also, the fibers are oriented in directions that intersect the plane direction of the molded article 1030 at the intermediate portions 1033. In this manner, when an impact is applied to the buffering material 1003, the first curved portions 1031 and the second curved portions 1032 are deformed and can exhibit the buffering function. Also, when an impact is applied to the buffering material 1003, the fibers in the intermediate portions 1033 are likely to move, and it is possible to exhibit the buffering function through the movement. Due to these synergistic effects, the buffering material 1003 can exhibit an excellent buffering function.

In the buffering material 1003, the first curved portions 1031 or the second curved portions 1032 are used as the pressure receiving portions that come into contact with the buffering target 1200. In this manner, it is possible to deform the first curved portions 1031 and the second curved portions 1032 with priority and to achieve an excellent buffering function.

Note that the present disclosure is not limited to the aforementioned configuration, and the side surface of the molded article 1030 on the +y-axis side or the side surface thereof on the −y-axis side may be used as the pressure receiving portion, for example.

Also, the adjacent intermediate portions 1033 are not secured in this embodiment as described above. In other words, when the first curved portions 1031 and the second curved portions 1032 as the pressure receiving portions receive a pressure, the adjacent intermediate portions 1033 are able to be relatively move. In this manner, when an impact is applied to the buffering material 1003, the intermediate portions 1033 are separated from each other, the first curved portions 1031 and the second curved portions 1032 are more likely to be deformed, for example, and a further excellent buffering function is achieved. Also, when an impact is applied to the buffering material 1003, an impact energy of an external force is consumed due to friction between the intermediate portions 1033, for example, and a further excellent buffering function is achieved.

On the assumption that the thickness direction of the sheet-shaped web 100S at the intermediate portions 1033 is a first direction, namely the x-axis direction, the direction in which the first curved portions 1031 and the second curved portions 1032 are connected is a second direction, namely, the z-axis direction, and the direction orthogonal to the x-axis direction and the z-axis direction is a third direction, namely a y-axis direction, the area A of a shape of the molded article 1030 projected in the x-axis direction, the area B of a shape of the molded article 1030 projected in the z-axis direction, and the area C of a shape of the molded article 1030 projected in the y-axis direction satisfy relationships of B>A and B>C. In this manner, it is possible to increase the areas of the first curved portions 1031 and the second curved portions 1032 as much as possible. Therefore, it is possible to exhibit an excellent buffering function in a wider range.

One of such buffering materials 1003 may be used alone, or a plurality of such buffering materials 1003 may be used in an overlapping or aligned manner.

Figure 17:
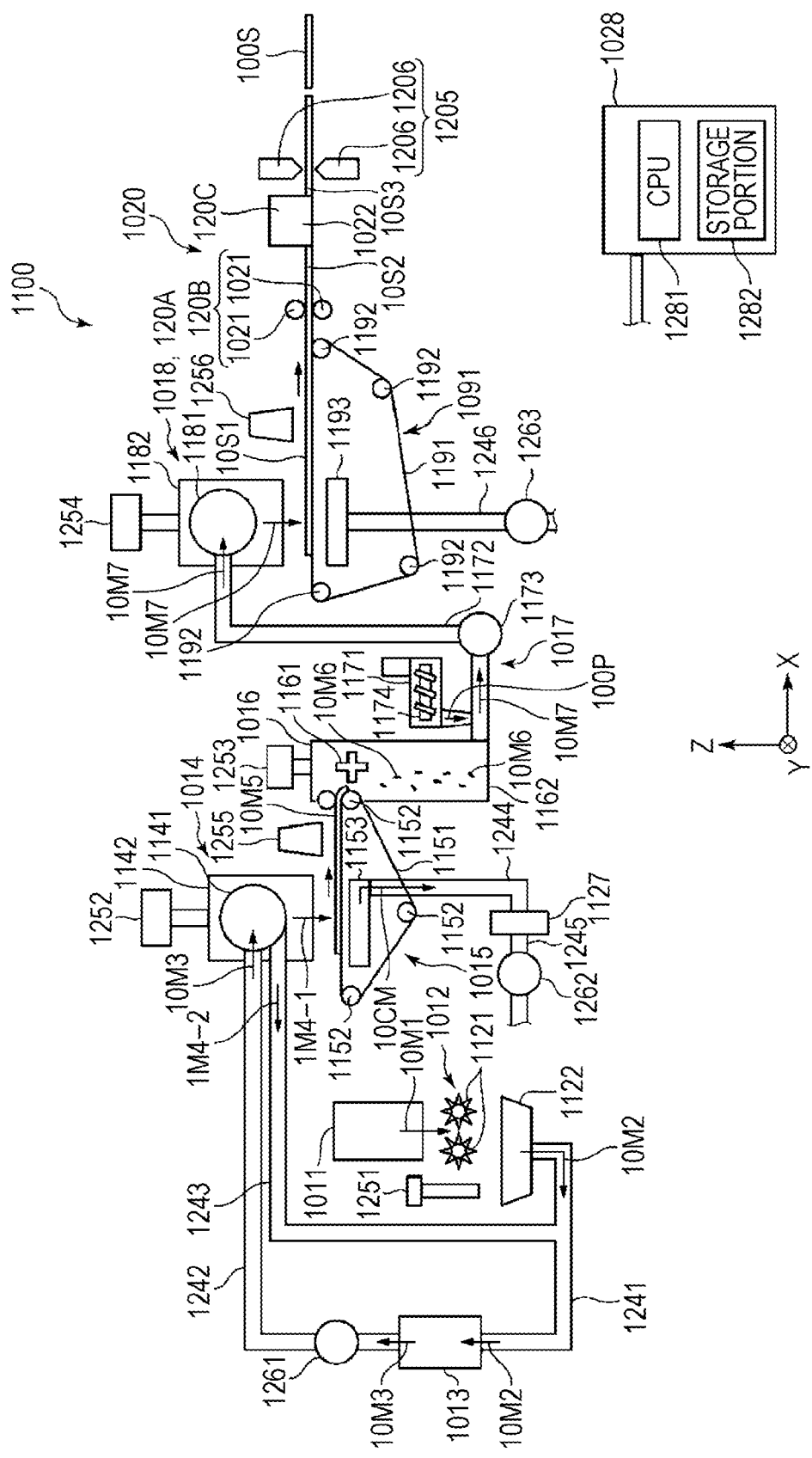
FIG. 17 is a schematic configuration diagram illustrating an example of a buffering material manufacturing apparatus for manufacturing the buffering material illustrated in FIG. 13.
Figure 18:
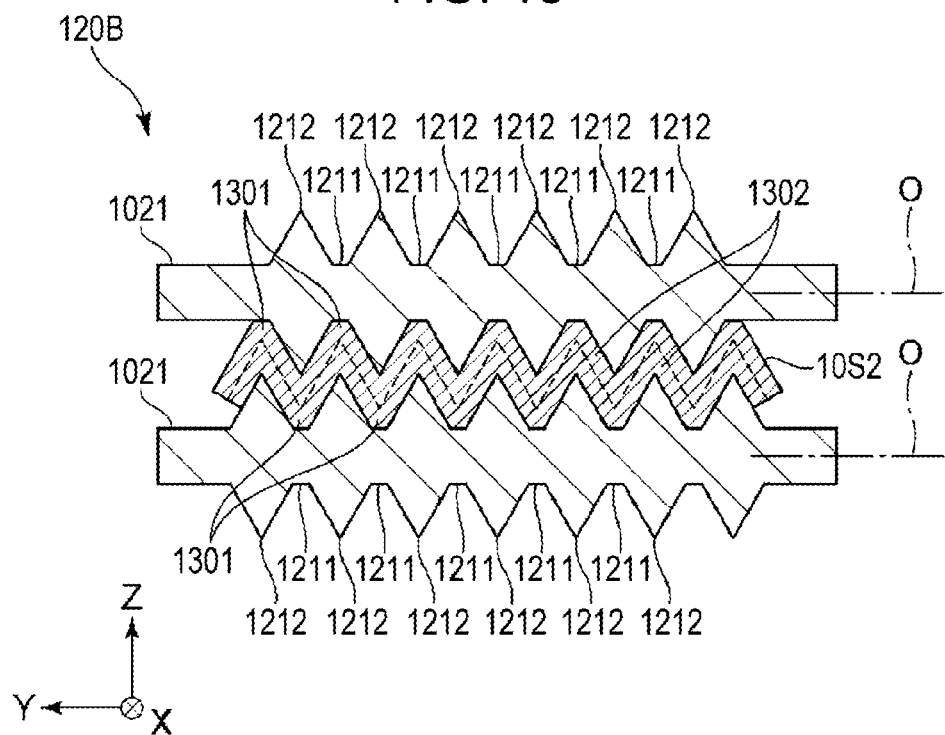
FIG. 18 is a sectional view of a first molding portion illustrated in FIG. 17.
Figure 19:
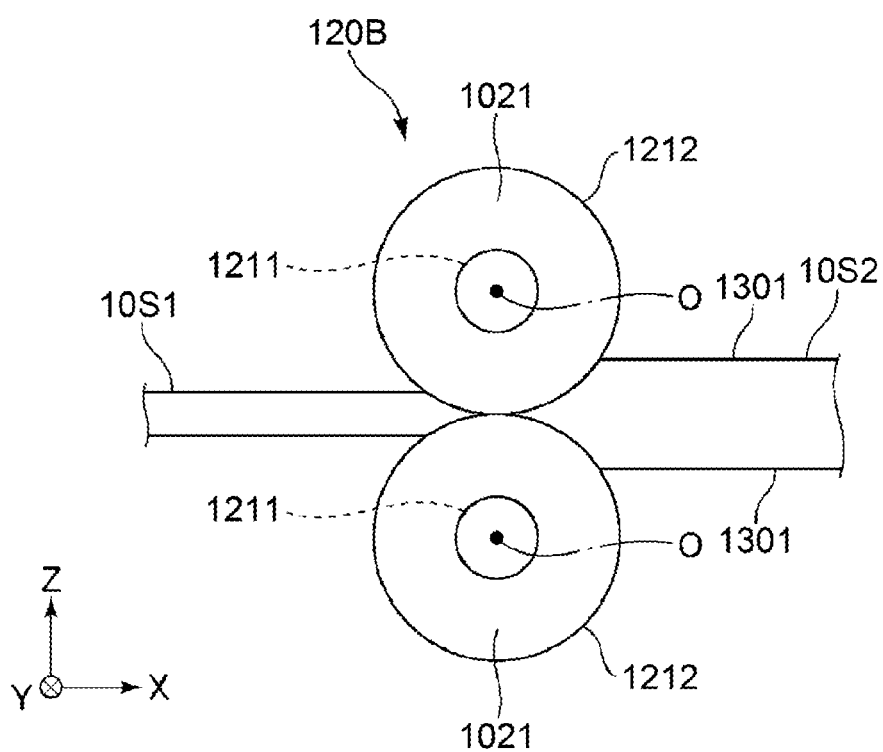
FIG. 19 is a side view of the first molding portion illustrated in FIG. 17.
Figure 20:
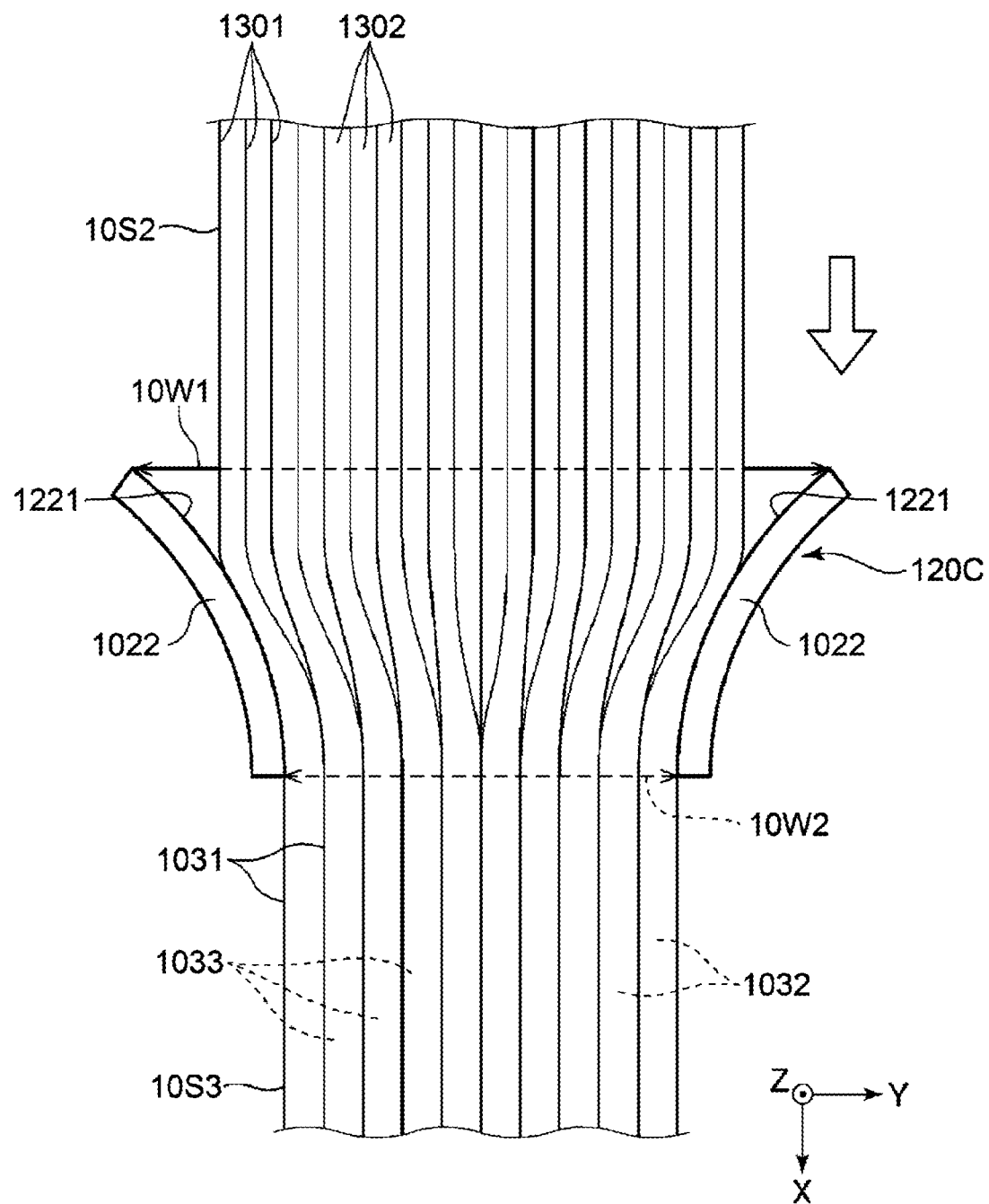
FIG. 20 is a view of a second molding portion illustrated in FIG. 17 when seen from a +Z-axis side.

Next, the buffering material manufacturing apparatus will be described. FIG. 17 is a schematic configuration diagram illustrating an example of the buffering material manufacturing apparatus for manufacturing the buffering material illustrated in FIG. 13. FIG. 18 is a sectional view of a first molding portion illustrated in FIG. 17. FIG. 19 is a side view of the first molding portion illustrated in FIG. 17. FIG. 20 is a view of a second molding portion illustrated in FIG. 17 when viewed from the +Z-axis side.

In the following description, the upper side in FIG. 17 will also be referred to as "above" or an "upper side" while the lower side therein will also be referred to as "below" or a "lower side" for convenience of explanation.

FIGS. 17 to 20 illustrate the X axis, the Y axis, and the Z axis as three axes that are orthogonal to each other for convenience of explanation. In the following description, the direction that is parallel to the X axis will also be referred to as an "X-axis direction", the direction that is parallel to the Y axis will also be referred to as a "Y-axis direction", and a direction that is parallel to the Z axis will also be referred to as a "Z-axis direction". In the following description, the leading end side of each illustrated arrow will be referred to as "+ (positive)" while the base end side thereof will be referred to as "− (negative)".

The buffering material manufacturing apparatus 1100 illustrated in FIG. 13 includes a raw material supply portion 1011, a crushing portion 1012, a defibration portion 1013, a sorting portion 1014, a first web forming portion 1015, a fine sorting portion 1016, a mixing portion 1017, a dispersion portion 1018, an accumulating portion 1019, and a molding portion 1020. Also, the buffering material manufacturing apparatus 1100 includes a humidifying portion 1251, a humidifying portion 1252, a humidifying portion 1253, a humidifying portion 1254, a humidifying portion 1255, a humidifying portion 1256, a blower 1261, a blower 1262, and a blower 1263.

Each of the portions included in the buffering material manufacturing apparatus 1100, for example, each of the raw material supply portion 1011, the crushing portion 1012, the defibration portion 1013, the sorting portion 1014, the first web forming portion 1015, the fine sorting portion 1016, the mixing portion 1017, the dispersion portion 1018, the accumulating portion 1019, the molding portion 1020, and the like is electrically coupled to a control portion 1028. Also, operations of each of these portions are controlled by the control portion 1028. The control portion 1028 includes a central processing unit (CPU) 1281 and a storage portion 1282. The CPU 1281 can execute various determinations and various commands, for example. The storage portion 1282 stores, for example, various programs such as a program regarding operations up to the molding of the fiber molded article.

The control portion 1028 may be incorporated in the buffering material manufacturing apparatus 1100 or may be provided in an external device such as an external computer. Also, there may be a case in which the external device communicates with the buffering material manufacturing apparatus 1100 via a cable or the like, a case in which wireless communication is performed therebetween, and a case in which the external device is coupled to the buffering material manufacturing apparatus 1100 via a network such as the Internet, for example. Also, the CPU 1281 and the storage portion 1282 may be integrated and configured as a single unit, for example, or the CPU 1281 may be incorporated in the buffering material manufacturing apparatus 1100 while the storage portion 1282 may be provided in an external device such as an external computer, or the storage portion 1282 may be incorporated in the buffering material manufacturing apparatus 1100 while the CPU 1281 may be provided in an external device such as an external computer.

The buffering material manufacturing apparatus 1100 executes a raw material supply step, a crushing step, a defibration step, a sorting step, a first web forming step, a decoupling step, a mixing step, a web forming step, a first molding step, a second molding step, and a cutting step in this order. Among these, the web forming step, the first molding step, and the second molding step are steps included in the method for manufacturing a buffering material according to the present disclosure. Note that steps other than these may be included in the method for manufacturing a buffering material according to the present disclosure.

Hereinafter, a configuration of each portion will be described.

The raw material supply portion 1011 is a portion that performs the raw material supply step of supplying a raw material 10M1 to the crushing portion 1012. As the raw material 10M1, a sheet-shaped material containing the aforementioned plant-derived fibers, that is, cellulose fibers is preferably used. Also, the raw material 10M1 may be in any form such as a woven fabric or a non-woven fabric. The raw material 10M1 may be, for example, recycled paper manufactured by defibrating waste paper or synthetic paper, representative examples of which include YUPO paper. YUPO paper is a registered trademark.

The crushing portion 1012 is a portion that performs the crushing step of crushing the raw material 10M1 supplied from the raw material supply portion 1011 in gas such as in atmosphere. The crushing portion 1112 is usually configured of a shredder and has a pair of crushing blades 1121 and a chute 1122.

The pair of crushing blades 1121 can crush, that is, cut the raw material 10M1 therebetween into crushed pieces 10M2 that are small strip-shaped pieces, that is, shredded pieces by rotating in mutually opposite directions. The shape and the size of the crushed pieces 10M2 are preferably suitable for the defibration process performed by the defibration portion 1013, are preferably small pieces with a length of a side of equal to or less than 100 mm, and are preferably small pieces with a length of a side of equal to or greater than 10 mm and equal to or less than 70 mm.

The chute 1122 is disposed below the pair of crushing blades 1121 and has a funnel shape, for example. In this manner, the chute 1122 can receive the crushed pieces 10M2 crushed by and dropping from the crushing blades 1121.

Also, the humidifying portion 1251 is disposed above the chute 1122 to be adjacent to the pair of crushing blades 1121. The humidifying portion 1251 is for humidifying the crushed pieces 10M2 in the chute 1122. The humidifying portion 1251 has a filter containing water, which is not illustrated, and is configured of a humidifier of a vaporization type or a warm wind vaporization type that supplies humidified air with increased humidity to the crushed pieces 10M2 by causing air to pass through the filter. It is possible to curb adhesion of the crushed pieces 10M2 to the chute 1122 due to static electricity by the humidified air being supplied to the crushed pieces 10M2.

The chute 1122 is coupled to the defibration portion 1013 via a pipe 1241 configuring a flow path. The crushed pieces 10M2 collected in the chute 1122 pass through the pipe 1241 and are transported to the defibration portion 1013.

The defibration portion 1013 is a portion that performs the defibration step of defibrating the crushed pieces 10M2 in the air, that is, in a dry method. It is possible to generate defibrated articles 10M3 from the crushed pieces 10M2 through the defibration process performed by the defibration portion 1013. Here, "defibrating" means disentangling the crushed pieces 10M2 obtained by the plurality of fibers being bonded into each one piece. Then, the disentangled articles are the defibrated articles 10M3. The shape of the defibrated articles 10M3 is a line shape or a strip shape.

The defibration portion 1013 is configured of an impeller mill that has a rotor rotating at a high speed and a liner located at an outer periphery of the rotor in the present embodiment, for example. The crushed pieces 10M2 that have flowed into the defibration portion 1013 are pinched and defibrated between the rotor and the liner.

The defibration portion 1013 can generate an air flow directed from the crushing portion 1012 to the sorting portion 1014 through the rotation of the rotor. In this manner, it is possible to suction the crushed pieces 10M2 from the pipe 1241 to the defibration portion 1013. Also, it is possible to send the defibrated articles 10M3 to the sorting portion 1014 via a pipe 1242 after the defibration process.

A blower 1261 is placed at a midpoint of the pipe 1242. The blower 1261 is an air flow generating device that generates an air flow directed to the sorting portion 1014. In this manner, the transport of the defibrated articles 10M3 to the sorting portion 1014 is promoted.

The sorting portion 1014 is a portion that performs the sorting step of sorting the defibrated articles 10M3 depending on how long the fibers are. In the sorting portion 1014, the defibrated articles 10M3 are sorted into first sorted articles 1M4-1 and second sorted articles 1M4-2 that are greater than the first sorted articles 1M4-1. The fibers in the first sorted articles 1M4-1 have sizes suitable for the manufacturing of the sheet-shaped web 100S performed thereafter or further the manufacturing of the buffering material 1003. This value is as described above. On the other hand, the second sorted articles 1M4-2 include, for example, articles that have insufficiently been defibrated, articles in which the defibrated fibers are excessively aggregated, and the like.

The sorting portion 1014 has a drum portion 1141 and a housing portion 1142 that accommodates the drum portion 1141.

The drum portion 1141 is a sieve configured of a net with a cylindrical shape and rotates about a center axis thereof. The defibrated articles 10M3 flow into the drum portion 1141 through the pipe 1242. Then, the defibrated articles 10M3 that are smaller than the mesh of the net are sorted as the first sorted articles 1M4-1, and the defibrated articles 10M3 with a size of greater than the mesh of the net are sorted as the second sorted articles 1M4-2, through the rotation of the drum portion 1141. Then, the first sorted articles 1M4-1 drop from the drum portion 1141.

On the other hand, the second sorted articles 1M4-2 are sent to a pipe 1243 coupled to the drum portion 1141. The pipe 1243 is coupled to the pipe 1241 on the opposite side of the drum portion 1141, that is, on the side downstream in the transport direction. The second sorted articles 1M4-2 that have passed through the pipe 1243 meet the crushed pieces 10M2 in the pipe 1241 and flow into the defibration portion 1013 along with the crushed pieces 10M2. In this manner, the second sorted articles 1M4-2 are returned to the defibration portion 1013 and are subject to the defibration process along with the crushed pieces 10M2.

It is possible to set the size of the fibers in the first sorted articles 1M4-1 passing through the drum portion 1141 within a predetermined range by selecting the mesh of the net in the drum portion 1141. Also, it is possible to set the size of the fibers in the first sorted articles 1M4-1 passing through a mesh belt 1151 within a predetermined range by selecting the mesh of the mesh belt 1151, which will be described later. It is possible to set the size of the fibers, particularly, the average fiber length of the fibers in the material configuring the buffering material 1003 to an appropriate value through such selection.

Also, the first sorted articles 1M4-1 that have passed through the drum portion 1141 drop when being dispersed in the air, and are directed to the first web forming portion 1015 as the separation portion located below the drum portion 1141. The first web forming portion 1015 is a portion that performs the first web forming step of forming a first web 10M5 from the first sorted articles 1M4-1. The first web forming portion 1015 has the mesh belt 1151, three tension rollers 1152, and a suctioning portion 1153.

The mesh belt 1151 is an endless belt, on which the first sorted articles 1M4-1 are accumulated. The mesh belt 1151 is hung around the three tension rollers 1152. Also, the tension rollers 1152 are coupled to a drive portion including a drive source such as a motor, a transmission, and the like, which is not illustrated, are driven to rotate by the driving of the drive portion, and the first sorted articles 1M4-1 on the mesh belt 1151 are transported downstream.

The first sorted articles 1M4-1 have a size of greater than the mesh of the mesh belt 1151. In this manner, passing of the first sorted articles 1M4-1 through the mesh belt 1151 is restricted, and it is thus possible to accumulate the first sorted articles 1M4-1 on the mesh belt 1151. Also, the first sorted articles 1M4-1 are transported downstream along with the mesh belt 1151 when being accumulated on the mesh belt 1151, thereby forming a layered first web 10M5.

There is a concern that foreign matters 10CM, that is, dirt, dust, or the like may be mixed in the first sorted articles 1M4-1. The foreign matters 10CM may be generated through the crushing or the defibration, for example. Such foreign matters 10CM are then collected by a collecting portion 1027, which will be described later.

The suctioning portion 1153 can suction the air from the lower side of the mesh belt 1151. In this manner, it is possible to suction the foreign matters 10CM passing through the mesh belt 1151 along with the air.

Also, the suctioning portion 1153 is coupled to the collecting portion 1027 via a pipe 1244. The foreign matters 10CM suctioned by the suctioning portion 1153 are collected to the collecting portion 1027.

A pipe 1245 is further coupled to the collecting portion 1027. The blower 1262 is placed at a midpoint of the pipe 1245. It is possible to generate a suctioning force in the suctioning portion 1153 through the operation of the blower 1262. In this manner, the formation of the first web 10M5 on the mesh belt 1151 is promoted. The first web 10M5 is a product from which the foreign matters 10CM have been removed. The dirt and the dust pass through the pipe 1244 and reach the collecting portion 1027 through the operation of the blower 1262.

The humidifying portion 1252 is coupled to a housing portion 1142. The humidifying portion 1252 is configured of a humidifier of a vaporization type that is similar to the humidifying portion 1251. In this manner, humidified air is supplied into the housing portion 1142. The humidified air can humidify the first sorted articles 1M4-1, and it is thus possible to curb adhesion of the first sorted articles 1M4-1 to the inner wall of the housing portion 1142 due to static electricity.

The humidifying portion 1255 is disposed downstream the sorting portion 1114. The humidifying portion 1255 is configured of an ultrasonic humidifier that sprays water. It is thus possible to supply water to the first web 10M5, and therefore, the amount of water in the first web 10M5 is adjusted. Adsorption of the first web 10M5 to the mesh belt 1151 due to static electricity can be curbed through the adjustment. In this manner, the first web 10M5 is easily peeled off from the mesh belt 1151 at the position at which the mesh belt 1151 is folded back at the tension rollers 1152.

The fine sorting portion 1116 is disposed downstream the humidifying portion 1255. The fine sorting portion 1116 is a portion that performs the decoupling step of decoupling the first web 10M5 that has been peeled off from the mesh belt 1151. The fine sorting portion 1116 has a propeller 1161 rotatably supported and a housing portion 1162 accommodating the propeller 1161. It is possible to decouple the first web 10M5 by the rotating propeller 1161. The decoupled first web 10M5 forms finely sorted articles 10M6. Further, the finely sorted articles 10M6 are lowered in the housing portion 1162.

The humidifying portion 1253 is coupled to the housing portion 1162. The humidifying portion 1253 is configured of a humidifier of a vaporization type that is similar to the humidifying portion 1251. In this manner, humidified air is supplied into the housing portion 1162. It is also possible to curb adhesion of the finely sorted articles 10M6 to the inner walls of the propeller 1161 and the housing portion 1162 due to static electricity with the humidified air.

A mixing portion 1117 is disposed downstream the fine sorting portion 1116. The mixing portion 1117 is a portion that performs the mixing step of mixing the finely sorted articles 10M6 and a resin 100P. The mixing portion 1117 has a resin supply portion 1171, a pipe 1172, and a blower 1173.

The pipe 1172 couples the fine sorting portion 1016 to the dispersion portion 118 of the web forming portion 120A and serves as a flow path through which a mixture 10M7 of the finely sorted articles 10M6 and the resin 100P passes.

The resin supply portion 1171 is coupled at a midpoint of the pipe 1172. The resin supply portion 1171 has a screw feeder 1174. It is possible to supply the resin 100P as powder or particles to the pipe 1172 by the screw feeder 1174 being driven to rotate. The resin 100P that has been supplied to the pipe 1172 is mixed with the finely sorted articles 10M6 and forms a mixture 10M7. Here, the resin 100P is a binder that binds the fibers in a post-step, that is, a bonding material, and the content, the composition, and the particle diameter thereof are as described above.

Note that what is supplied from the resin supply portion 1171 may include the aforementioned additives as needed in addition to the resin 100P. The additives may be supplied separately from the resin 100P or may be contained in the resin 100P in advance and may be supplied from the resin supply portion 1171.

The blower 1173 is placed at a midpoint of the pipe 1172 downstream the resin supply portion 1171. The finely sorted articles 10M6 and the resin 100P are mixed through an action of a rotating portion such as a blade included in the blower 1173. The blower 1173 can generate an air flow directed to the dispersion portion 1018 that performs the next step. The finely sorted articles 10M6 and the resin 100P can be stirred and mixed in the pipe 1172 using the air flow. In this manner, the mixture 10M7 can flow into the dispersion portion 1018 of the web forming portion 1020A in a state in which the finely sorted articles 10M6 and the resin 100P are uniformly dispersed. The finely sorted articles 10M6 in the mixture 10M7 are disentangled into a finer fiber form in a process of passing through the pipe 1172.

Note that it is possible to set a blending ratio of the fibers and the resin 100P in the mixture 10M7 by adjusting the amount of supplied resin 100P from the resin supply portion 1171 with respect to the finely sorted articles 10M6 flowing into the pipe 1172 from the fine sorting portion 1116. The setting can be achieved by adjusting the rotation speed of the screw feeder 1174 to adjust the amount of supplied resin 100p per unit time through the control performed by the control portion 1028, for example. It is possible to set the content of fibers in the material configuring the buffering material 1003 or the content of resin to the appropriate value as described above through such setting.

The web forming portion 120A is a portion that forms the sheet-shaped web 10S1 and a portion that executes the web forming step. The web forming portion 120A has the dispersion portion 1018 and the accumulating portion 1019. The dispersion portion 1018 executes the dispersion step, and the accumulating portion 1019 executes the accumulation step. In other words, the web forming step includes the dispersion step and the accumulation step.

The dispersion portion 1018 is a portion that performs the dispersion step of disentangling and dispersing the entangled fibers in the mixture 10M7. The dispersion portion 1018 has a drum portion 1181 and a housing portion 1182 that accommodates the drum portion 1181.

The drum portion 1181 is a sieve configured of a net with a cylindrical shape and rotating about the center axis. The mixture 10M7 flows into the drum portion 1181. Fibers and the like that are smaller than the mesh of the net in the mixture 10M7 can pass through the drum portion 1181 by the drum portion 1181 rotating. At that time, the mixture 10M7 is disentangled.

Note that the drum portion 1181 is not limited to the rotating drum shape, the drum portion 1181 may be a sieve vibrating in the in-plane direction and having a mesh or may be configured to spray the mixture 10M7 as a spray.

Then, the mixture 10M7 disentangled by the drum portion 1181 drops when being dispersed in the air and is directed to the accumulating portion 1019 located below the drum portion 1181. Therefore, the fibers are randomly accumulated in a state with no orientation. The accumulating portion 1019 is a portion that performs the web forming step of forming the sheet-shaped web 10S1 from the mixture 10M7. The accumulating portion 1019 has a mesh belt 1191, tension rollers 1192, and a suctioning portion 1193.

The mesh belt 1191 is an endless belt, on which the mixture 10M7 is accumulated. The mesh belt 1191 is hung around four tension rollers 1192. Then, the mixture 10M7 on the mesh belt 1191 is transported downstream by the tension rollers 1192 being driven to rotate.

Also, a most part of the mixture 10M7 on the mesh belt 1191 has a size of greater than the mesh of the mesh belt 1191. In this manner, passing of the mixture 10M7 through the mesh belt 1191 is restricted, and it is thus possible to accumulate the mixture 10M7 on the mesh belt 1191. Also, since the mixture 10M7 is transported downstream along with the mesh belt 1191 when being accumulated on the mesh belt 1191, the mixture 10M7 forms a layered sheet-shaped web 1051.

The tension rollers 1192 are coupled to a drive portion with a drive source such as a motor, a transmission, and the like, which is not illustrated, and can rotate at a predetermined rotation speed through the operation of the drive portion. Operations of the drive portion are controlled by the control portion 1028, and it is possible to make rotation speed of the tension rollers 1192 variable, in particular, it is possible to set the rotation speed in multiple stages or in no stage.

The suctioning portion 1193 can suction the air from the lower side of the mesh belt 1191. In this manner, it is possible to suction the mixture 10M7 on the mesh belt 1191, that is, the sheet-shaped web 1051 downward, the accumulation of the mixture 10M7 on the mesh belt 1191 is thus promoted, and it is possible to promote the adjustment of the thickness of the sheet-shaped web 1051, which will be described later.

A pipe 1246 is coupled to the suctioning portion 1193. The blower 1263 is placed at a midpoint of the pipe 1246. It is possible to generate a suctioning force by the suctioning portion 1193 through the operations of the blower 1263. The operations of the blower 1263 are controlled by the control portion 1028.

A part of the mixture 10M7 that has passed through the mesh belt 1191 due to the air flow suctioned by the suctioning portion 1193 is returned to an upstream path, which is not illustrated, due to the air flow from the blower 1263 and is supplied into the pipe 1241 and the housing portion 1162, for example, and it is thus possible to recycle the part of the mixture 10M7.

In this manner, the buffering material manufacturing apparatus 1100 has the suctioning portion 1193 that suctions the sheet-shaped web 1051 on the mesh belt 1191 via the mesh belt 1191. In this manner, the accumulation of the mixture 10M7 on the mesh belt 1191 is promoted, and it is possible to promote the adjustment of the thickness of the sheet-shaped web 10S1. Note that the fibers are randomly oriented along the X-Y plane on the surface of the mesh belt 1191. The obtained sheet-shaped web 10S1 has a first surface 130A and a second surface 130B opposite to each other. In the sheet-shaped web 10S1, the fibers are oriented in the plane direction of the first surface 130A and the second surface 130B. In this manner, the web forming step is a step of forming the sheet-shaped web 10S1, which contains the fibers and the resin 100P as the bonding material that bonds the fibers and has the first surface 130A and the second surface 130B opposite to each other, and in which the fibers are oriented in the plane direction of the first surface 130A and the second surface 130B.

The size of the fibers, in particular, the average fiber length of the fibers in the mixture 10M7 passing through the mesh belt 1191 can be finely adjusted within a further appropriate range by selecting the mesh of the mesh belt 1191, adjusting the strength of the suctioning performed by the suctioning portion 1193, and the like. In this manner, it is possible to cause the size of the fibers, in particular, the average fiber length of the fibers in the material configuring the buffering material 1003 to approach the appropriate value as described above.

The web forming portion 120A may further have a roller located upstream a roller, which will be described later, to perform at least either heating or pressurization, which is not illustrated. In this manner, it is possible to effectively adjust the thickness of the sheet-shaped web 1051, the density of the configuring material, and the like.

Also, the humidifying portion 1254 is coupled to the housing portion 1182. The humidifying portion 1254 is configured of a humidifier of a vaporization type that is similar to the humidifying portion 1251. In this manner, humidified air is supplied into the housing portion 1182. The humidified air can humidify the inside of the housing portion 1182, and it is thus possible to curb adhesion of the mixture 10M7 to the inner wall of the housing portion 1182 due to static electricity.

The humidifying portion 1256 is disposed downstream the dispersion portion 1018. The humidifying portion 1256 is configured of an ultrasonic humidifier that is similar to the humidifying portion 1255. In this manner, it is possible to supply water to the sheet-shaped web 10S1, and the amount of water in the sheet-shaped web 1051 is thus adjusted. It is possible to curb adsorption of the sheet-shaped web 10S1 to the mesh belt 1191 due to static electricity through the adjustment. In this manner, the sheet-shaped web 10S1 is easily peeled off from the mesh belt 1191 at a position at which the mesh belt 1191 is folded back at the tension rollers 1192.

Note that the amount of water added by the humidifying portions 1251 to 1256 is preferably equal to or greater than 0.5 parts by mass and equal to or less than 20 parts by mass with respect to 100 parts by mass of the material before the humidification, for example.

The first molding portion 120B is disposed downstream the accumulating portion 1019. The first molding portion 120B is a portion that performs the first molding step of processing the sheet-shaped web 10S1 into a wave shape and molding the sheet-shaped web 10S2 that is an intermediate article. The first molding portion 120B has a pair of molding rollers 1021. The pair of molding rollers 1021 are for heating and pressurizing the sheet-shaped web 1051 and are disposed above and below a transport path of the sheet-shaped web 1051 with the transport path interposed therebetween. The sheet-shaped web 1051 is heated, pressurized, and molded into a wave shape by passing between the pair of molding rollers 1021.

As illustrated in FIG. 18, the molding rollers 1021 have a shape in which small diameter portions 1211 and large diameter portions 1212 are alternately disposed in an axis O direction. In other words, the molding rollers have a shape in which peaks and valleys are alternately disposed. The molding roller 1021 on the upper side is provided with five small diameter portions 1211 and with six large diameter portions 1212. The molding roller 1021 on the lower side is provided with six small diameter portions 1211 and with seven large diameter portions 1212. The molding roller 1021 on the upper side and the molding roller 1021 on the lower side are disposed with a deviation of a half pitch such that the small diameter portions 1211 and the large diameter portions 1212 overlap each other.

The large diameter portions 1212 of the molding roller 1021 on the upper side enter the small diameter portions 1211 of the molding roller 1021 on the lower side, and the large diameter portions 1212 of the molding roller 1021 on the lower side enter the small diameter portions 1211 of the molding roller 1021 on the upper side. Also, the molding rollers 1021 on the upper side and the molding roller 1021 on the lower side are separated from each other with no contact.

When the sheet-shaped web 10S1 passes between the pair of molding rollers 1021, the sheet-shaped web 10S1 is pressed by the large diameter portions 1212 of one of the molding rollers 1021 against the small diameter portions 1211 of the other molding roller 1021 to form folded-back portions, and also, the sheet-shaped web 1051 is pressed by the large diameter portions 1212 of the other molding roller 1021 against the small diameter portions 1211 of the one molding roller 1021 to form folded-back portions, thereby forming a sheet-shaped web 10S2. In the sheet-shaped web 10S2, the folded-back portions are formed in the Y-axis direction, and adjacent folded-back portions have different folded-back directions. Among these folded-back portions, the folded-back portions projecting on the +Z-axis side correspond to the first curved portions 1031, and the folded-back portions projecting on the −Z-axis side correspond to the second curved portions 1032. In the stage of the sheet-shaped web 10S2, the intermediate portions 1033 are in a state in which they are inclined in the Z-axis direction.

The orientation direction of the fibers in the sheet-shaped web 10S2 is the plane direction of the sheet-shaped web 10S2 and is in a state along the irregularity of the molding rollers 1021 as represented by the dashed line in FIG. 18. In other words, the orientation direction of the fibers in the sheet-shaped web 10S2 is a direction along the wave shape formed in the first surface 130A and the second surface 130B and is the plane direction of the first surface 130A and the second surface 130B.

Note that one of the pair of molding rollers 1021 is a driving roller that is driven through operations of a motor, which is not illustrated, while the other molding roller 1021 is a driven roller. However, the present disclosure is not limited thereto, and both the pair of molding rollers 1021 may be coupled to a motor or may not be coupled to any motor.

Also, a pressing force, that is, a molding load of the pair of molding rollers 1021 is preferably equal to or greater than 100 kgf and equal to or less than 20,000 kgf and is more preferably equal to or greater than 300 kgf and equal to or less than 10,000 kgf. In this manner, it is possible to more significantly express the wave shape of the sheet-shaped web 10S2.

A pressure applied to the sheet-shaped web 10S1 at the time of the molding, that is, the molding pressure is preferably equal to or greater than 0.1 kgf/cm$^2$ and equal to or less than 100 kgf/cm$^2$ and is more preferably equal to or greater than 0.5 kgf/cm$^2$ and equal to or less than 50 kgf/cm$^2$. In this manner, it is possible to more significantly express the wave shape of the sheet-shaped web 10S2.

In this embodiment, the pair of molding rollers 1021 also perform heating of the sheet-shaped web 10S1 in addition to the pressurization as described above. In this manner, the resin 100P that is a binding agent is melted, and the fibers are bound via the melted resin 100P in the sheet-shaped web 10S1. Therefore, the shape of the sheet-shaped web 10S2 molded into the wave shape is more likely to be maintained. The pressurization temperature of the molding rollers 1021 is preferably equal to or greater than 100° C. and equal to or less than 250° C. and is more preferably equal to or greater than 150° C. and equal to or less than 210° C. In this manner, it is possible to satisfactorily melt the resin 100P and to more reliably perform the binding of the fibers. The transport speed of the sheet-shaped web 10S1 is preferably such a speed that allows the heating time of the molding rollers 1021 to be equal to or greater than 3 seconds and equal to or less than 400 seconds and is more preferably such a speed that allows the heating time to be equal to or greater than 10 seconds and equal to or less than 360 seconds. In this manner, it is possible to more reliably melt the resin 100P.

In this manner, it is possible to enhance moldability and shape retention by the molding rollers 1021 performing both heating and pressurization.

Note that the molding rollers 1021 may be configured to perform either the heating or the pressurization. The molding rollers 1021 may omit the heating when the aforementioned web forming portion 1020A has a roller that performs heating, in particular. Also, one of the pair of molding rollers 1021 may be omitted.

Also, it is only necessary for the sheet-shaped web 10S2 to have higher shape retention as compared with the sheet-shaped web 10S1. Therefore, the resin 100P in the sheet-shaped web 10S2 may be a state in which an entirety or a part of the resin 100P is in a half-melted state and the fibers are not completely bound, in addition to the case in which the resin 100P is completely solidified to bind the fibers.

In this manner, the first molding portion 120B molds the sheet-shaped web 10S1 into the sheet-shaped web 10S2 with a wave shape. Also, the molded sheet-shaped web 10S2 is transported to the second molding portion 120C provided downstream the first molding portion 120B.

The second molding portion 1020C is a portion that reduces the pitches of the wave shape of the sheet-shaped web 10S2 that is an intermediate article and molding the sheet-shaped web 10S2 into a sheet-shaped web 100S that is a molded article 1030.

The second molding portion 120C has a pair of guide members 1022 that are separated from each other in the Y-axis direction with the transport path of the sheet-shaped web 10S2 interposed therebetween. Also, the pair of guide members 1022 have guide surfaces 1221 that come into contact with the sheet-shaped web 10S2 that is being transported to narrow the width of the sheet-shaped web 10S2.

The guide surfaces 1221 have a separation distance therebetween that decreases downstream in the transport direction, that is, on the +X-axis side. The separation distance between the guide members 1022 reaches the maximum separation distance 10W1 at an end on the −X-axis side and is longer than the width of the sheet-shaped web 10S2, that is, the length thereof in the Y-axis direction. In this manner, it is possible to more reliably cause the sheet-shaped web 10S2 to pass between the pair of guide members 1022. The minimum separation distance 10W2 is reached at the end on the +X-axis side and is shorter than the width of the sheet-shaped web 10S2, that is, the length thereof in the Y-axis direction. In this manner, the compression is performed in the direction of narrowing the width in the process in which the sheet-shaped web 10S2 passes between the pair of guide members 1022. Therefore, the pitches of the wave shape of the sheet-shaped web 10S2 are narrowed.

The guide surfaces 1221 are configured of curved surfaces that are curved in the mutually approaching direction. It is thus possible to more smoothly reduce the width of the sheet-shaped web 10S2.

The second molding portion 120C is compressed until the adjacent folded-back portions 1301 of the sheet-shaped web 10S2 come into contact with each other. In this manner, intermediate portions 1302 are oriented in the up-down direction, and the intermediate portions 1033 are formed. In other words, the orientation direction of the fibers at the intermediate portions 1033 becomes the orientation along the X-Z plane. Thus, the sheet-shaped web 100S as illustrated in FIG. 1 is molded.

The sheet-shaped web 10S3 obtained through the second molding portion 120C is transported toward the cutting portion 1205 disposed downstream.

The cutting portion 1205 is a portion that performs the cutting step of cutting the sheet-shaped web 10S3 into a predetermined length to form the sheet-shaped web 100S. The cutting portion 1205 has a pair of cutting blades 1206 disposed above and below a transport path of the sheet-shaped web 10S3 with the transport path interposed therebetween. Both the cutting blades 1206 operate to approach and be separated from each other and cut the sheet-shaped web 10S3 in a direction that intersects the transport direction, in particular, an orthogonal direction. Both the cutting blades 1206 operate at a predetermined timing corresponding to the transport speed of the sheet-shaped web 10S3 to cut the sheet-shaped web 10S3 into a desired length. Although not illustrated in the drawing, the cutting blades may cut the sheet-shaped web 100S in the direction that is parallel to the transport direction to adjust the width of the sheet-shaped web 100S into a desired length. In this manner, one end and the other end of the sheet-shaped web 100S in the width direction are cut and removed to adjust the sheet-shaped web 100S into a desired web. As described above, the sheet-shaped web 100S, that is, the buffering material 1003 is manufactured.

As described above, the method for manufacturing a buffering material according to the present disclosure includes: the web forming step of forming the sheet-shaped web 10S1 which contains the fibers and the bonding material that bonds the fibers and has the first surface 130A and the second surface 130B opposite to each other, and in which the fibers are oriented in the plane direction of the first surface 130A and the second surface 130B; the first molding step of molding the sheet-shaped web 10S2 that is an intermediate article with a wave shape that has the first curved portions 1031 projecting on the side of the first surface 130A, the second curved portions 1032 projecting on the second surface 130B, and the intermediate portions 1033 located between the first curved portions 1031 and the second curved portions 1032; and the second molding step of molding the sheet-shaped web 10S2 into the sheet-shaped web 10S3 that is the molded article 1030 by reducing the pitches of the wave shape of the sheet-shaped web 10S2. It is thus possible to easily and simply manufacture the buffering material 1003 according to the present disclosure. Also, it is possible to more effectively prevent or curb breakage or wrinkles at the time of the molding by molding the sheet-shaped web 10S2 as the intermediate article once and then adjusting the pitches of the wave shape in the second molding step.

As described above, the sheet-shaped web 10S2 that is the intermediate article is molded by pressing the molding rollers 1021 with the small diameter portions 1211 and the large diameter portions 1212 alternately aligned in the axial direction against the sheet-shaped web 10S1 that is being transported in the first molding step. It is thus possible to collectively perform the molding and the transport and to manufacture the sheet-shaped web 10S1 and the sheet-shaped web 10S2 without stopping the transport thereof at the time of the molding.

In the second molding step, the sheet-shaped web 10S2 that is the intermediate article is caused to pass between the pair of guide members 1022 separated from each other by a distance that is narrower than the width of the sheet-shaped web 1052. In this manner, it is possible to collectively perform the molding and the transport, and it is possible to manufacture the sheet-shaped web 10S2 and the sheet-shaped web 100S without stopping the transport thereof at the time of the molding.

Also, the buffering material manufacturing apparatus 1100 includes: the web forming portion 120A that forms the sheet-shaped web 10S1 which contains the fibers and the bonding material that bonds the fibers and has the first surface 130A and the second surface 130B opposite to each other, and in which the fibers are oriented in the plane direction of the first surface 130A and the second surface 130B; the first molding portion 120B that molds the sheet-shaped web 10S1 into the sheet-shaped web 10S2 as the intermediate article with a wave shape that has the first curved portions 1031 projecting on the side of the first surface 130A, the second curved portions 1032 projecting on the second surface 130B, and the intermediate portions 1033 located between the first curved portions 1031 and the second curved portions 1032; and the second molding portion 120c that molds the sheet-shaped web 10S2 into the molded article by reducing the pitches of the wave shape of the sheet-shaped web 10S2. It is thus possible to easily and simply manufacture the buffering material 1003 according to the present disclosure. Also, it is possible to more effectively prevent or curb breakage or wrinkles at the time of the molding by molding the sheet-shaped web 10S2 as the intermediate article once and then adjusting the pitches of the wave shape in the second molding step.

Third Embodiment

Figure 21:
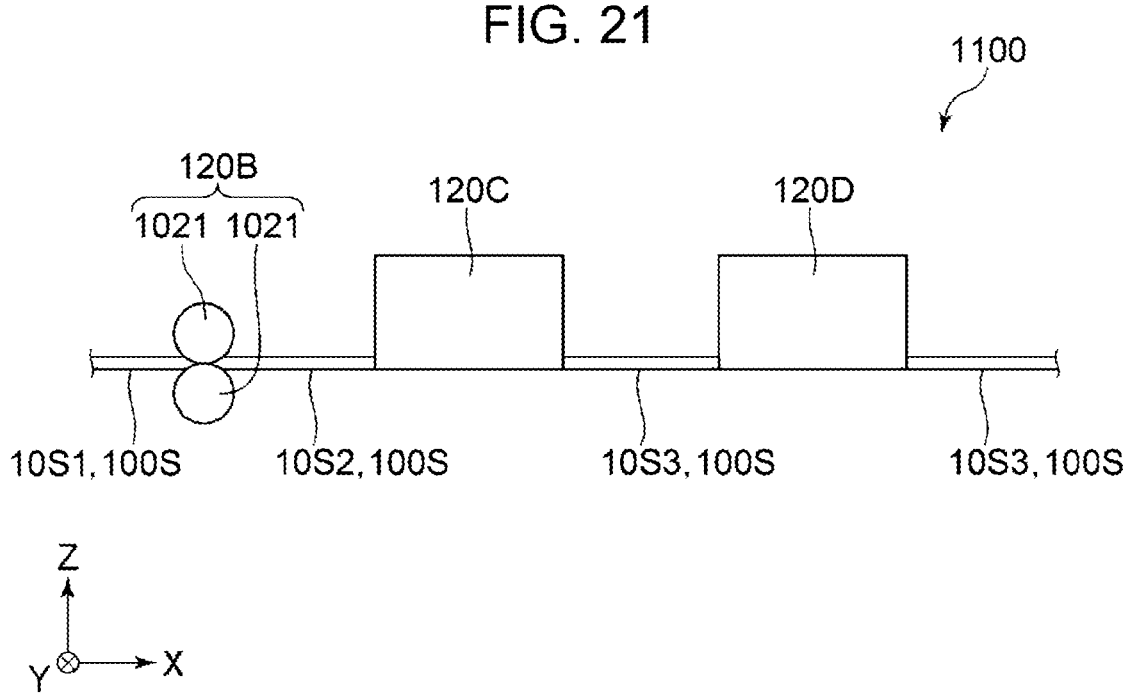
FIG. 21 is a partially enlarged view illustrating a third embodiment of a buffering material manufacturing apparatus according to the present disclosure.

FIG. 21 is a partially enlarged view illustrating a third embodiment of the buffering material manufacturing apparatus according to the present disclosure.

Although the third embodiment will be described below, points that are different from those in the second embodiment will be mainly described, and description of similar items will be omitted in the following description.

As illustrated in FIG. 21, the buffering material manufacturing apparatus 1100 has a cooling portion 120D as a third molding portion downstream the second molding portion 120C in this embodiment. The cooling portion 120D has a function of cooling the sheet-shaped web 100S. In this manner, the resin 100P as a binding agent, in particular, is cooled, and it is thus possible to firmly bind the fibers. It is thus possible to fix the wave shape of the sheet-shaped web 100S.

The cooling portion 120D is configured of a nozzle that sprays air, for example. Also, the nozzle may be configured to spray the air onto the sheet-shaped web 100S from the +Z-axis side, may be configured to spray the air onto the sheet-shaped web 100S from the −Z-axis side, or may be configured to spray the air onto the sheet-shaped web 100S from both the +Z-axis side and the −Z-axis side.

The cooling temperature of the cooling portion 120D depends on the composition of the resin 100P, is preferably equal to or greater than 10° C. and equal to or less than 60° C., and is more preferably equal to or greater than 17° C. and equal to or less than 40° C., for example.

In this manner, the buffering material manufacturing apparatus 1100 according to this embodiment has the cooling portion 120D that cools the sheet-shaped web 100S. It is thus possible to more effectively fix the wave shape of the sheet-shaped web 100S.

Fourth Embodiment

Figure 22:
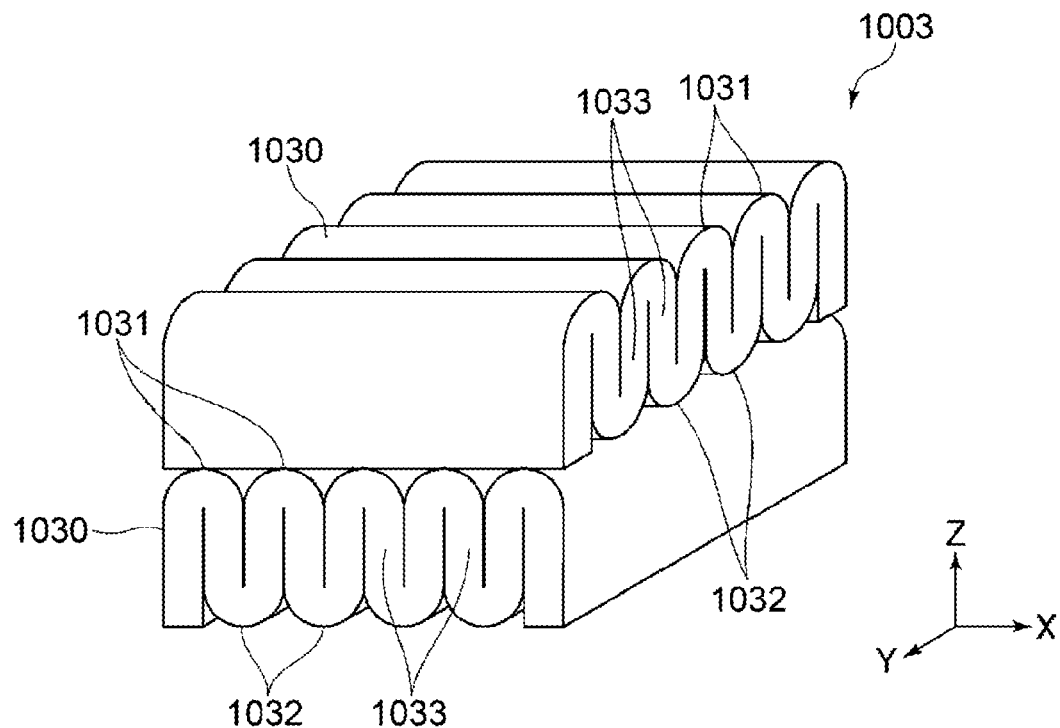
FIG. 22 is a perspective view of a fourth embodiment of a buffering material according to the present disclosure.

FIG. 22 is a perspective view of a fourth embodiment of the buffering material according to the present disclosure.

Although the fourth embodiment will be described below, points that are different from those in the second embodiment will be mainly described, and description of similar items will be omitted in the following description.

As illustrated in FIG. 22, the buffering material 1003 has two molded articles 1030 in this embodiment. The two molded articles 1030 are laminated in the Z-axis direction. The two molded articles 1030 are disposed in an orientation with which the first curved portions 1031 are located on the +Z-axis side and the second curved portions 1032 are located on the −Z-axis side.

In the molded article 1030 on the upper side, the direction in which the first curved portions 1031 are aligned and the direction in which the second curved portions 1032 are aligned are the Y-axis direction. On the other hand, in the molded article 1030 on the lower side, the direction in which the first curved portions 1031 are aligned and the direction in which the second curved portions 1032 are aligned are the X-axis direction. In other words, in the upper and lower molded articles 1030, the direction in which the first curved portions 1031 are aligned and the direction in which the second curved portions 1032 are aligned are different from each other, and in particular, the directions are orthogonal to each other.

In the molded article 1030 on the upper side, the orientation direction of the fibers at the intermediate portion 1033 is the plane direction of the X-Z plane. In the molded article 1030 on the lower side, the orientation direction of the fibers at the intermediate portion 1033 is the plane direction of the Y-Z plane. The buffering material 1003 according to this embodiment can exhibit a further excellent buffering function against an impact from the Z-axis direction in accordance with the lamination of the two molded articles 1030 by the molded articles being disposed in such an orientation.

Further, the molded article 1030 on the upper side can exhibit an excellent buffering function against an impact from the X-axis direction as well. The molded article 1030 on the lower side can exhibit an excellent buffering function against an impact from the Y-axis direction as well.

In this manner, the buffering material 1003 according to this embodiment can exhibit an excellent buffering function against impacts from the X-axis direction, the Y-axis direction, and the Z-axis direction.

Although the buffering material, the method for manufacturing the buffering material, and the buffering material manufacturing apparatus according to the present disclosure have been described above based on the illustrated embodiments, the present disclosure is not limited thereto, and a configuration of each part can be replaced with an arbitrary configuration with a similar function. Also, other arbitrary configurations or steps may be added to the buffering material, the method for manufacturing the buffering material, and the buffering material manufacturing apparatus according to the present disclosure.

What is claimed is:

1. An accommodating body comprising:
   a first accommodating body that has a first bottom portion; and
   a first buffering material that has a first pressure receiving surface coming into contact with an accommodated article accommodated in the first accommodating body and that includes a first end portion of at least one first sheet-shaped web, the at least one first sheet-web containing fibers and a bonding material that bonds the fibers and including a pair of surfaces with side surfaces therebetween, each of the pair of surfaces extending along a plane direction, the side surfaces each having a thickness that is smaller than all dimensions of each of the pair of surfaces in the plane direction in the at least one first sheet-shaped web, the first end portion being a portion cut from the at least one first sheet-shaped web so as to include a cut surface cut from the at least one first sheet-shaped web and include a part of the side surfaces of the at least one first sheet-shaped web, wherein
   in the at least one first sheet-shaped web, the fibers being oriented in the plane direction of the at least one first sheet-shaped web, and
   the first end portion being disposed on the first bottom portion and oriented such that the cut surface serves as the first pressure receiving surface.

2. The accommodating body according to claim 1, wherein
   the first buffering material is a laminate which has a plurality of first sheet-shaped webs, each of which is the at least one first sheet-shaped web, and in which the plurality of first sheet-shaped webs are laminated in a thickness direction,
   the first end portion is a portion cut from the laminate so as to include the cut surface cut from the laminate and include the part of side surfaces of the plurality of first sheet-shaped webs.

3. The accommodating body according to claim 1, wherein
   the first buffering material has a positioning portion that positions the accommodated article.

4. The accommodating body according to claim 1, wherein
   the first accommodating body has a partitioning portion that partitions inside of the first accommodating body, and
   the first buffering material has a support portion that supports the partitioning portion.

5. The accommodating body according to claim 1, further comprising:

a second accommodating body that has a second bottom portion and accommodates the first accommodating body; and a second buffering material that comes into contact with the first accommodating body accommodated in the second accommodating body.

6. The accommodating body according to claim 5, wherein the second buffering material has a second pressure receiving surface coming into contact with the first accommodating body and includes a second end portion of at least one second sheet-shaped web, the at least one second sheet-web contains fibers and a bonding material that bonds the fibers and includes a pair of surfaces with side surfaces therebetween, the second end portion is a portion cut from the second sheet-shaped web so as to include a cut surface cut from the second sheet-shaped web and include a part of the side surfaces of the second sheet-shaped web, and the second end portion is oriented such that the cut surface serves as the second pressure receiving surface.

7. The accommodating body according to claim 5, wherein the second accommodating body has a side wall that is provided to stand from the second bottom portion, and the second buffering material is disposed at one of the second bottom portion and the side wall, or disposed at both of the second bottom portion and the side wall.

8. The accommodating body according to claim 5, wherein the second accommodating body has a lid body, and the second buffering material is disposed at the lid body.

\* \* \* \* \*